(12) United States Patent
Miller et al.

(10) Patent No.: US 12,736,149 B2
(45) Date of Patent: Sep. 15, 2026

(54) RAILWAY TANK CAR HAVING A DISCHARGE VALVE ASSEMBLY AND A DIS-ENGAGEABLE VALVE HANDLE ASSEMBLY COUPLED TO THE DISCHARGE VALVE ASSEMBLY

(71) Applicant: Gunderson LLC, Lake Oswego, OR (US)

(72) Inventors: Lukas P. Miller, Newberg, OR (US); Scott J. Hart, Milwaukie, OR (US); Ben Miller, St. Louis, MO (US); Thomas Stevens, Dardenne Prairie, MO (US)

(73) Assignee: Gunderson LLC, Lake Oswego, OR (US)

( * ) Notice: Subject to any disclaimer, the term of this patent is extended or adjusted under 35 U.S.C. 154(b) by 51 days.

(21) Appl. No.: 18/914,734

(22) Filed: Oct. 14, 2024

(65) Prior Publication Data

US 2026/0104101 A1 Apr. 16, 2026

(51) Int. Cl.

| | |
|---|---|
| ***F16K 27/07*** | (2006.01) |
| ***B61D 5/06*** | (2006.01) |
| ***F16K 31/60*** | (2006.01) |
| ***F16K 35/02*** | (2006.01) |

(52) U.S. Cl.
CPC ................ *F16K 27/07* (2013.01); *B61D 5/06* (2013.01); *F16K 31/60* (2013.01); *F16K 35/027* (2013.01)

(58) Field of Classification Search
CPC ............................... F16K 27/07; F16K 35/027
USPC .......................................................... 251/344
See application file for complete search history.

(56) References Cited

U.S. PATENT DOCUMENTS

| | | | |
|---|---|---|---|
| 927,621 | A | 7/1909 | Williams |
| 1,284,063 | A | 11/1918 | Betts |
| 1,399,608 | A | 12/1921 | Garrett |
| 1,523,484 | A | 1/1925 | Lindstrom |
| 1,667,525 | A | 4/1928 | Bashcongi |
| 1,714,927 | A | 5/1929 | Shield |
| 1,995,174 | A | 3/1935 | Sidney et al. |
| 2,045,758 | A | 6/1936 | Crossen |
| 2,073,513 | A | 3/1937 | Dietrichson et al. |
| 3,930,634 | A | 1/1976 | Loveless |
| 4,106,749 | A | 8/1978 | Behle |
| 4,141,535 | A | 2/1979 | Reedy et al. |
| 4,234,160 | A | 11/1980 | Behle |
| 4,268,010 | A | 5/1981 | Behle |
| 4,429,855 | A | 2/1984 | Buffone |
| 4,455,110 | A | 6/1984 | Schipper |
| 4,474,078 | A | 10/1984 | Denkowski et al. |
| 4,941,410 | A | 7/1990 | Dalrymple et al. |
| 6,213,449 | B1 | 4/2001 | Portis et al. |

(Continued)

OTHER PUBLICATIONS

"AAR Manual of Standards and Recommended Practices Specifications for Tank Cars", American Association of Rail MSRP C-III Appendix E Section 8.4, May 2024.

*Primary Examiner* — Paul J Gray
(74) *Attorney, Agent, or Firm* — Adam H. Masia

(57) ABSTRACT

A railway tank car having a dis-engageable valve handle assembly configured to selectively engage, lock, and actuate a discharge valve assembly connected to a tank of railway tank car, wherein the dis-engageable valve handle assembly is configured to prevent accidental or inadvertent opening of a valve of the discharge valve assembly in the case of an accident or a derailment of the railway tank car.

25 Claims, 37 Drawing Sheets

(56) References Cited

U.S. PATENT DOCUMENTS

| | | | | |
|---|---|---|---|---|
| 9,694,828 | B2 | 7/2017 | Saxton et al. | |
| 10,060,549 | B2 | 8/2018 | Becherer | |
| 11,248,720 | B2 | 2/2022 | Dzolovic et al. | |
| 2009/0309057 | A1 | 12/2009 | Liccardi | |
| 2014/0261072 | A1 | 9/2014 | Thompson et al. | |
| 2015/0090150 | A1 | 4/2015 | Bertram et al. | |
| 2015/0336590 | A1* | 11/2015 | Saxton .................. | F16K 35/025 137/350 |
| 2016/0075347 | A1* | 3/2016 | Thompson ............... | G05G 1/08 105/358 |

* cited by examiner

RAILWAY TANK CAR HAVING A DISCHARGE VALVE ASSEMBLY AND A DIS-ENGAGEABLE VALVE HANDLE ASSEMBLY COUPLED TO THE DISCHARGE VALVE ASSEMBLY

BACKGROUND

The railroad industry employs a variety of different railroad cars for transporting different materials. For example, various known railroad cars often carry liquids and are sometimes called "railway tank cars." Known railway tank cars include one or more openable top hatches that seal the top opening(s) of the railway tank car (when the railway tank car is not being loaded) to protect the liquids in the railway tank car from the elements and other external sources. Various known railway tank cars include one or more discharge valve assemblies at the bottom of the railway tank car for unloading the liquids from the railway tank car.

There is a continuing need to provide improved railway tank cars that reduce the likelihood of damage to the discharge valve assemblies, and that prevent the unintentional and inadvertent openings of such discharge valve assemblies.

SUMMARY

Various embodiments of the present disclosure provide a railway tank car having a discharge valve assembly and a dis-engageable valve handle assembly coupled to the discharge valve assembly that prevents the unintentional and inadvertent openings of the discharge valve assembly.

Various embodiments of the present disclosure provide a dis-engageable valve handle assembly couplable to a discharge valve assembly of a railway tank car that prevents the unintentional and inadvertent openings of the discharge valve assembly.

Other objects, features, and advantages of the present disclosure will be apparent from the following detailed disclosure, taken in conjunction with the accompanying sheets of drawings, wherein like reference numerals refer to like parts.

DETAILED DESCRIPTION

Figure 1:
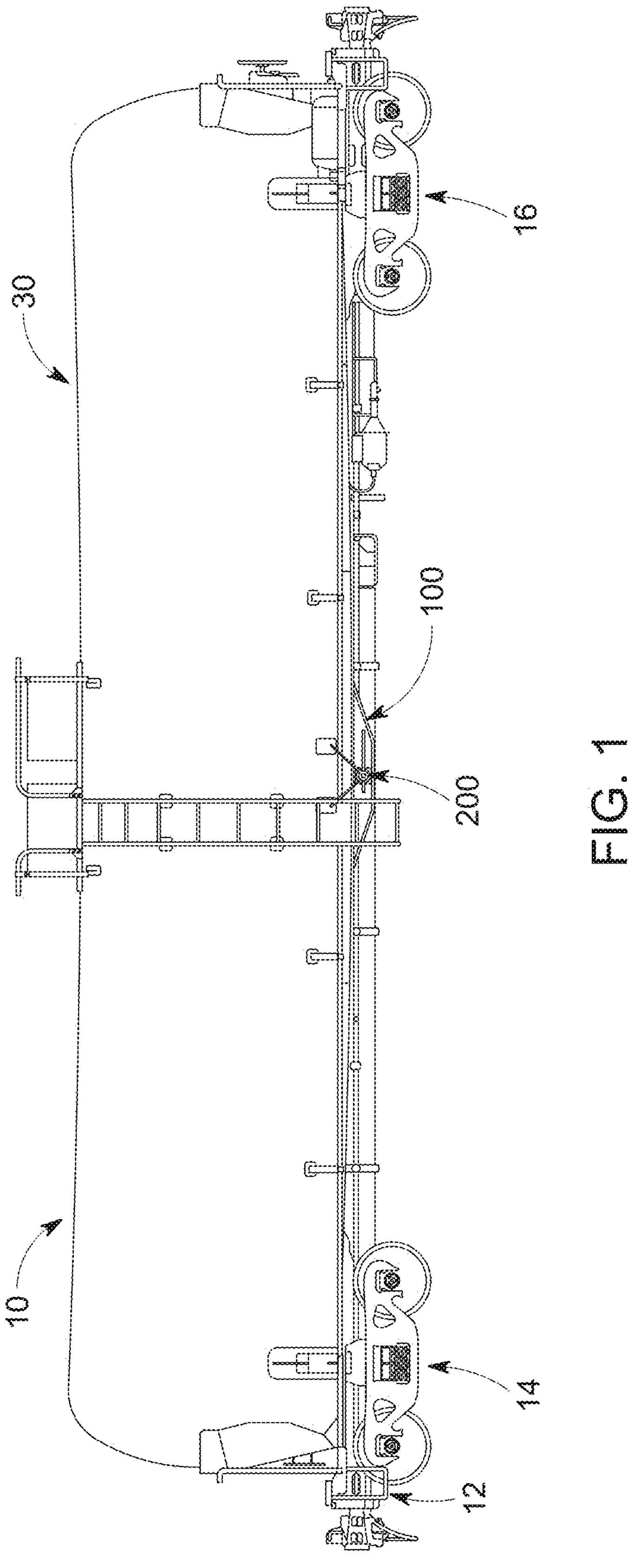
FIG. 1 is a side view of a railway tank car configured to transport a variety of liquids and including a tank, a valve protective enclosure connected to a bottom portion of the tank, a discharge valve assembly connected to the bottom of the tank and protected by the valve protective enclosure, and a dis-engageable valve handle assembly connected to the bottom of the tank, partially supported by the valve protective enclosure, and coupled to the discharge valve assembly in accordance with one example embodiment of the present disclosure.
Figure 2:
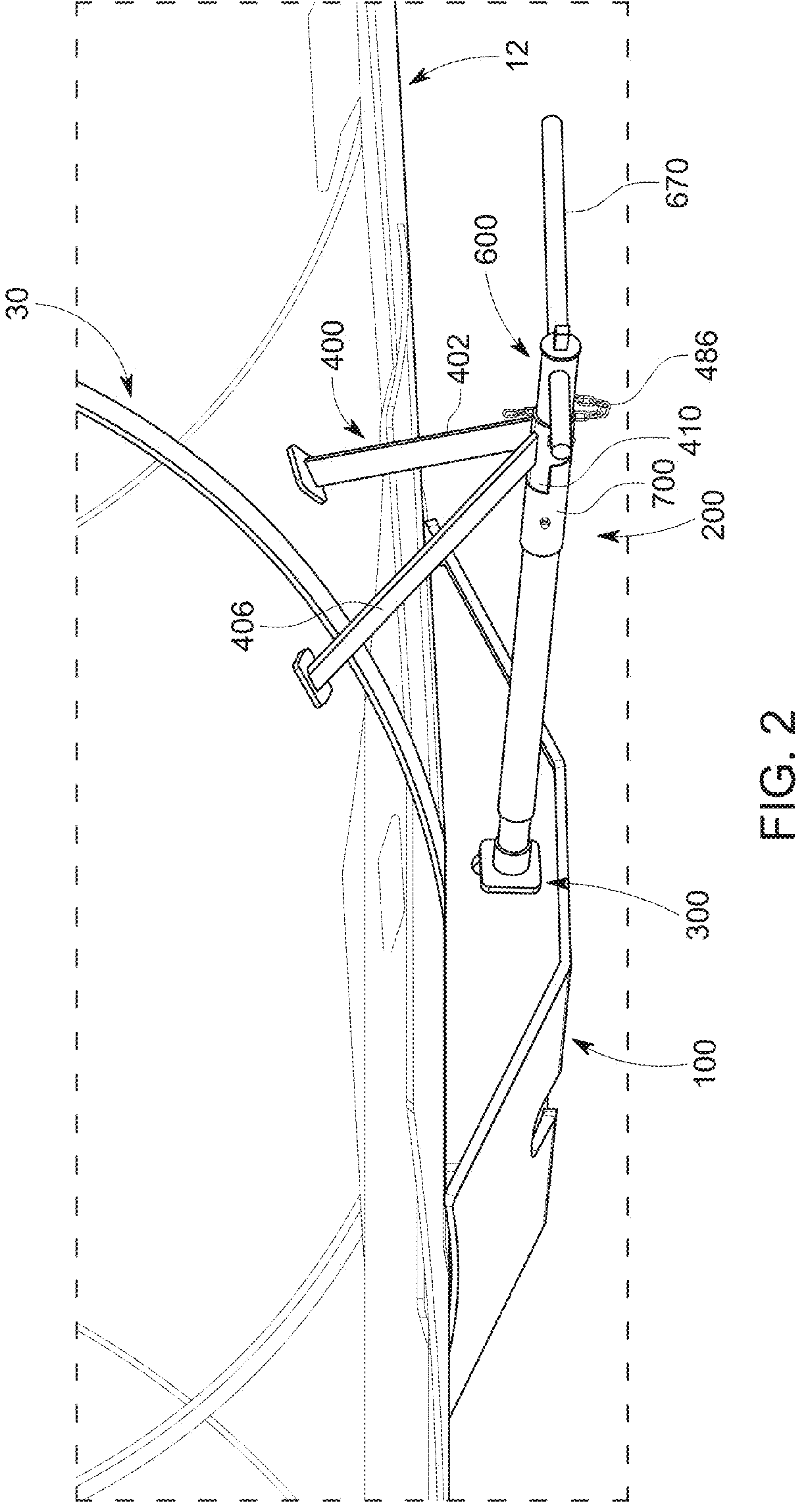
FIG. 2 is a fragmentary bottom perspective view of part of the railway tank car of FIG. 1, and that shows part of the tank, part of the valve protective enclosure, and part of the dis-engageable valve handle assembly.
Figure 3:
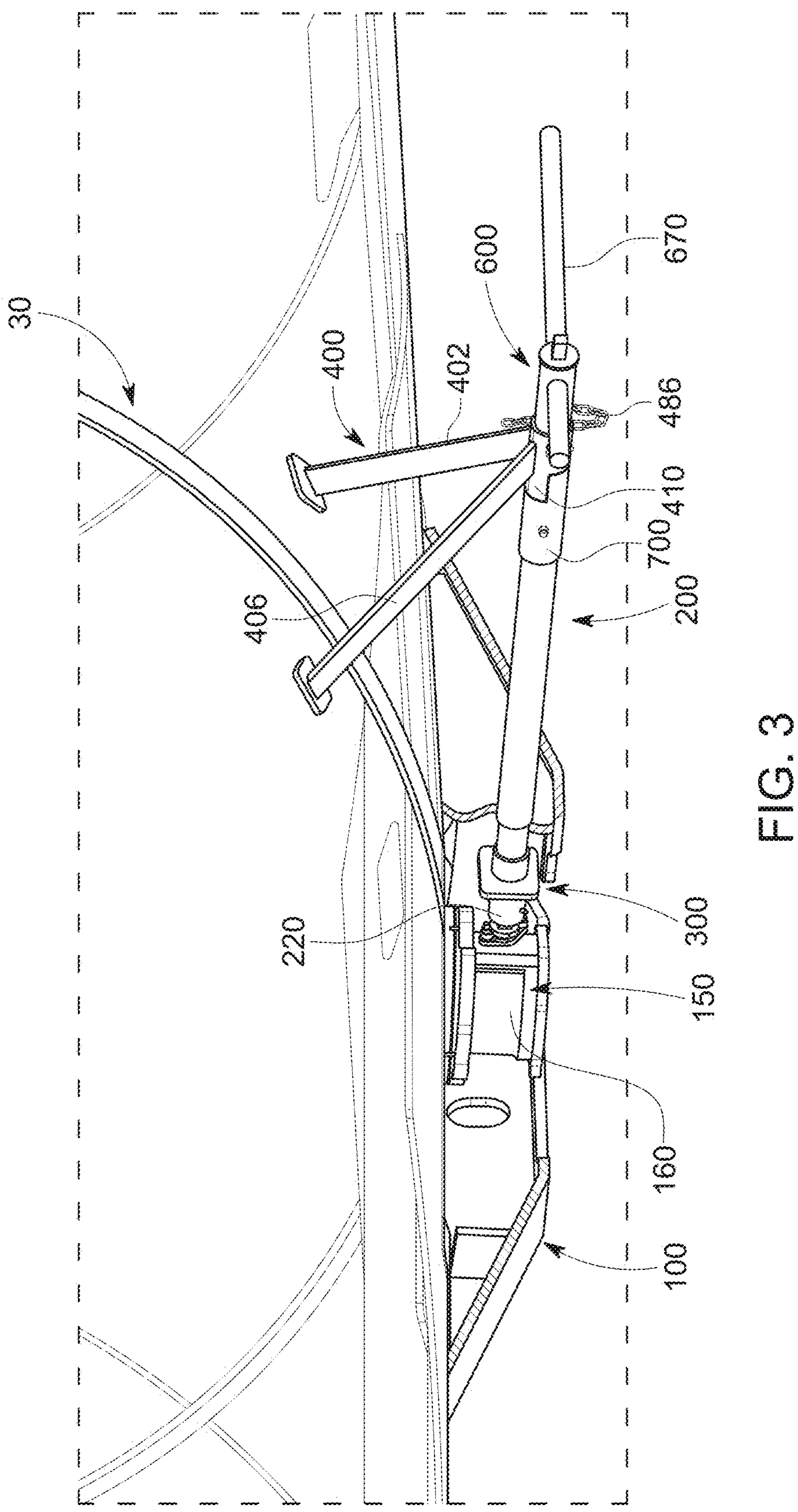
FIG. 3 is a fragmentary bottom partial cross-sectional perspective view of part of the railway tank car of FIG. 1, and that shows part of the tank, part of the valve protective enclosure, the discharge valve assembly, and the dis-engageable valve handle assembly.

While the features, devices, and apparatus described herein may be embodied in various forms, the drawings show and the specification describe certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, and the like, are not intended to be limited to direct mounting methods but should be interpreted broadly to include indirect and operably coupled, mounted, connected and like mounting methods. This specification is intended to be taken as a whole and interpreted in accordance with the principles of the present disclosure and as understood by one of ordinary skill in the art.

Various embodiments of the present disclosure provide a railway tank car having a discharge valve assembly and a dis-engageable valve handle assembly coupled to the discharge valve assembly that prevents the unintentional and inadvertent openings of the discharge valve assembly.

Various embodiments of the present disclosure also provide a dis-engageable valve handle assembly couplable to a discharge valve assembly of a railway tank car that prevents the unintentional and inadvertent openings of such discharge valve assembly.

FIGS. 1 to 18D illustrate an example railway tank car 10 in accordance with one example embodiment of the present disclosure. The illustrated example railway tank car 10 includes: (1) a frame 12; (2) spaced-apart trucks 14 and 16 configured to support the frame 12; (3) a plurality of wheels (not labeled) that support the trucks 14 and 16; (4) a tank 30 connected to and supported by the frame 12 (and thus the trucks and the wheels); (5) a valve protective enclosure 100 connected to a bottom portion of the tank 30; (6) a discharge valve assembly 150 connected to a bottom portion of the tank 30 and protected by the valve protective enclosure 100; and (7) a dis-engageable valve handle assembly 200 connected to a bottom portion of the tank 30, connected to and partially supported by the valve protective enclosure 100, and coupled to the discharge valve assembly 150 in an engageable and dis-engageable manner, such as described herein.

The dis-engageable valve handle assembly 200 is configured to prevent the unintentional and inadvertent openings of the discharge valve assembly.

More specifically, the dis-engageable valve handle assembly 200 is configured to: (1) cause a stem adapter 220 (described below) within the valve protective enclosure 100 to actuate and open a valve 160 of the discharge valve assembly 150 within the valve protective enclosure 100; (2) cause the stem adapter 220 to actuate and close the valve 160 of the discharge valve assembly 150; (3) lock the stem adapter 220 within the valve protective enclosure 100; and (4) un-lock the stem adapter 220 within the valve protective enclosure 100. In other words, the dis-engageable valve handle assembly 200 is configured to selectively activate and deactivate a spring loaded valve locking mechanism of the discharge valve assembly 150.

The dis-engageable valve handle assembly 200 includes various components that are positioned inside of the valve protective enclosure 100 to prevent undesired unlocking and actuation and thus undesired opening of the valve 160 of discharge valve assembly 150 in the case of an accident or a derailment of the railway tank car 10.

The dis-engageable valve handle assembly 200 includes various components that are positioned outside of the valve protective enclosure 100 to prevent accidental and inadvertent engagement with, actuation of, and opening of the valve 160 of discharge valve assembly in the case of an accident or a derailment of the railway tank car 10.

The dis-engageable valve handle assembly 200 prevents: (1) undesired valve dis-engagement inside the valve protective enclosure 100; (2) undesired engagement outside the valve protective enclosure 100; and (3) undesired dis-engagement and locking in all rotational positions other than the valve closed position.

The dis-engageable valve handle assembly 200 employs two (inner and outer) fixed sleeves, an extension tube selectively movable within such sleeves, and a moveable sleeve attached to the extension tube, wherein the sleeves co-act prevent the unwanted rotation of the extension tube (and the handle attached thereof) to prevent unwanted engagement with and actuation of the discharge valve assembly 150. The fixed sleeves include an inner locking sleeve and an outer guide sleeve that limit the movement of the handle of the dis-engageable valve handle assembly 200 to select positions as described below.

The dis-engageable valve handle assembly 200 is also configured to be compliant with the recent requirements stated in American Association of Rail MSRP C-III Appendix E Section 8.4 dated May 2024.

More specifically, as best seen in FIGS. 1, 2, 3, 4, and 5, the valve protective enclosure 100 includes: (1) longitudinally extending spaced-apart side walls 112 and 114 fixedly connected to the bottom of the tank 30; (2) transversely extending spaced-apart braces 116 and 118 extending between and fixedly connected to the side walls 112 and 114; and (3) a longitudinally extend base 120 fixedly connected to the bottom ends of the side walls 112 and 114 and to the braces 116 and 118. The side walls 112 and 114, the braces 116 and 118, and the base 120 support and provide a protective structure for the discharge valve assembly 150. The side wall 114 also supports parts of the dis-engageable valve handle assembly 200. The side wall 114 also defines an opening 115 through which defines parts of the dis-engageable valve handle assembly 200 extend such as explained below.

The side walls 112 and 114, the braces 116 and 118, and the base 120 of the valve protective enclosure 100 are made from steel in this example embodiment, but can be made from other suitable materials in accordance with the present disclosure. The valve protective enclosure can be alternatively sized, shaped, and otherwise configured in accordance with the present disclosure.

As best seen in FIGS. 3, 4, 5, 14A-14D, 17A-17D, and 18A-18D, the discharge valve assembly 150 includes the valve 160 (mentioned above) suitably connected (such as by fasteners such as bolts (not shown)) to a saddle flange (not label) attached (such as by welding) to the bottom portion of the tank 30. The discharge valve assembly 150 is positioned within the valve protective enclosure 100.

The valve 160 can be any suitable valve such one of the valves currently employed for such railway tank cars or any new valve developed in the future. As best seen in FIGS. 14A-14D, 17A-17D, and 18A-18D, the valve 160 includes an outwardly extending rotatable valve stem 164. In this example embodiments, when the valve stem 164 is rotated in the clockwise direction, the valve stem 164 causes the valve 160 to open and thus liquids in the tank 30 to be released through the valve 160. When the valve stem 164 is fully rotated in the counter-clockwise direction, the valve stem 164 causes the valve 160 to close and thus prevent liquids in the tank 30 from being released through the valve 160. It should be appreciated that in other embodiment, the valve can be configured in an opposite operational manner such that when the valve stem 164 is rotated in the counter-clockwise direction, the valve stem 164 causes the valve 160 to open and when the valve stem 164 is fully rotated in the clockwise direction, the valve stem 164 causes the valve 160 to close. In such embodiment, various of the components of the dis-engageable valve handle assembly described herein would have mirrored configurations to various of the components as suitably required.

Figure 19:
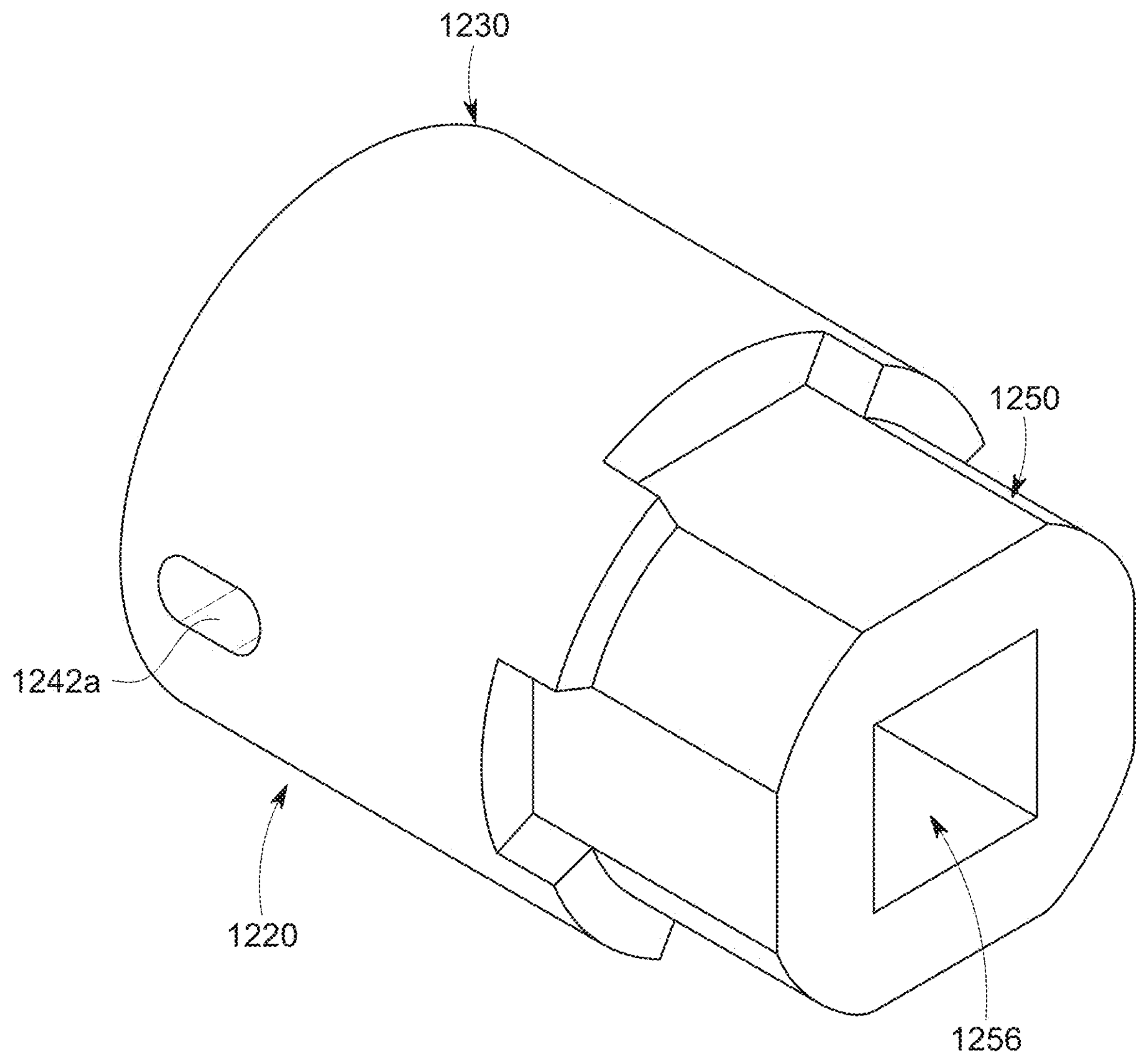
FIG. 19 is a first perspective view of a valve stem adapter of a dis-engageable valve handle assembly of a railway tank car of another example embodiment of the present disclosure.
Figure 20:
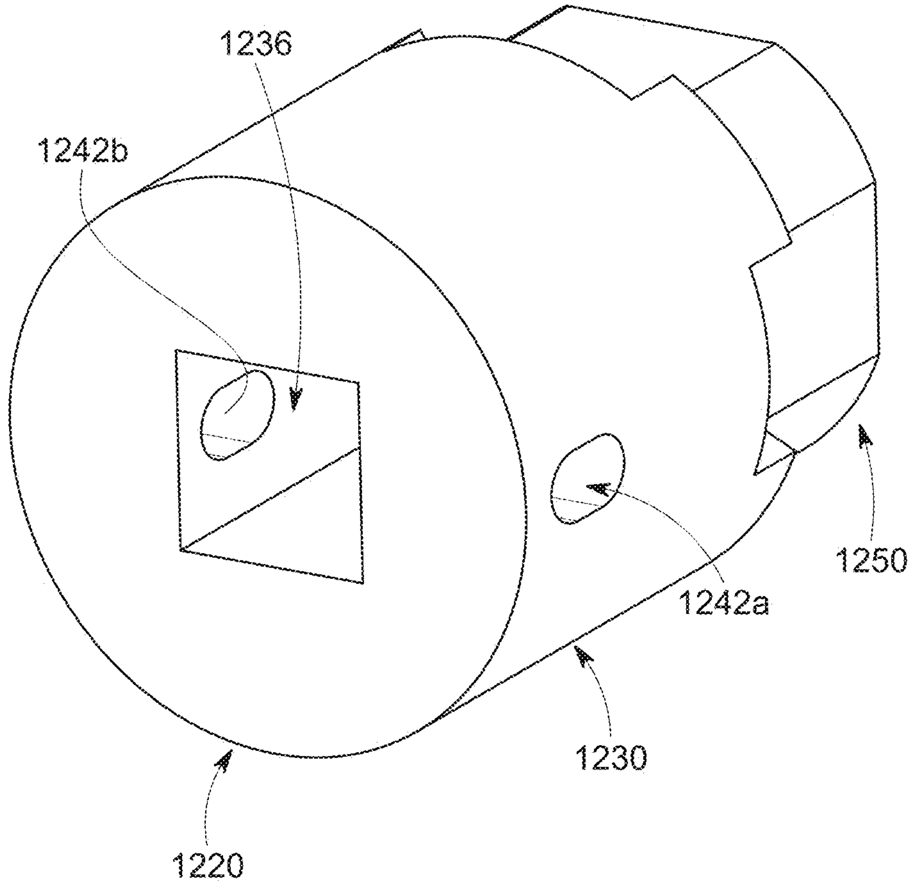
FIG. 20 is a second perspective view of the valve stem adapter of FIG. 19.
Figure 21:
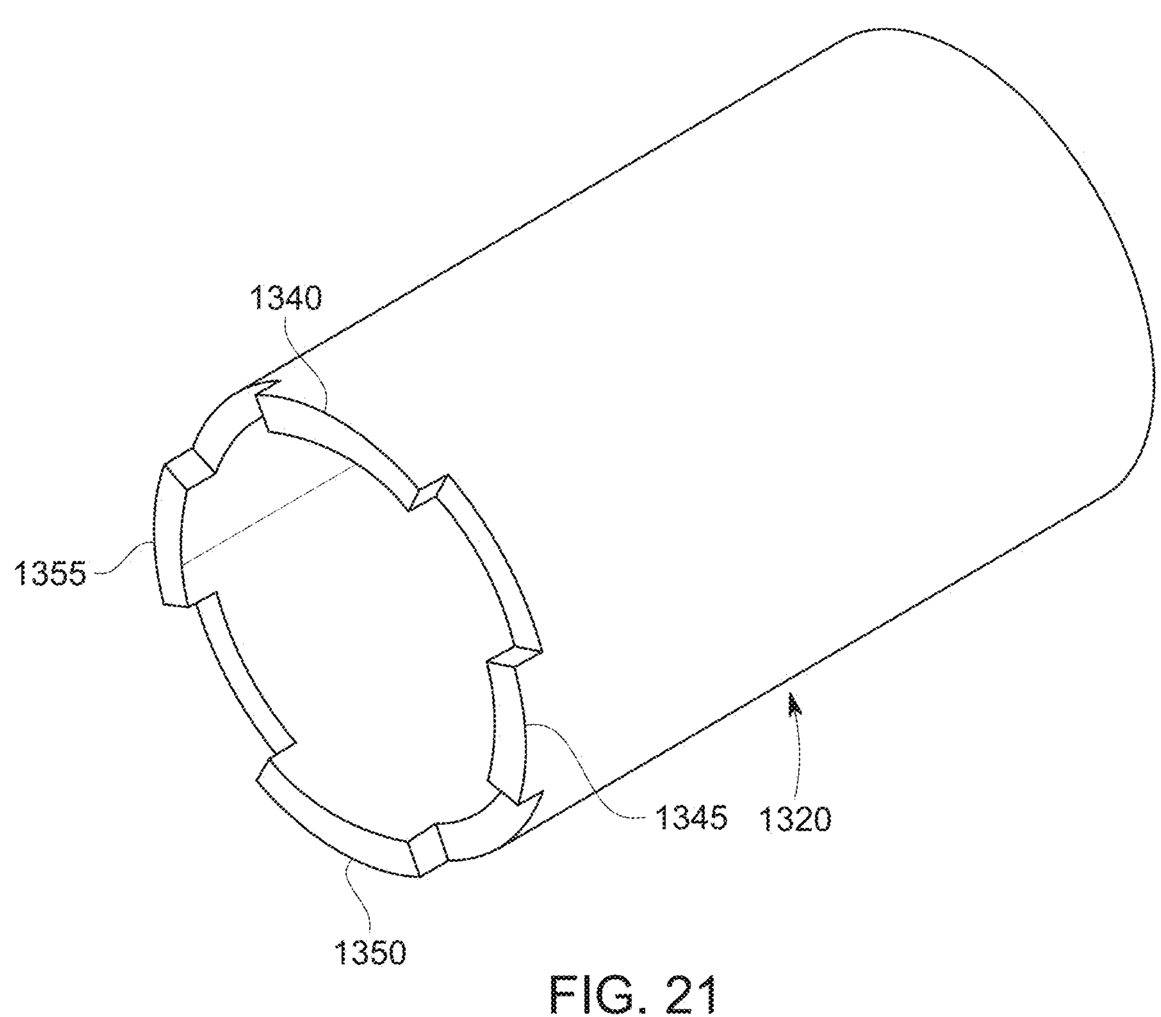
FIG. 21 is a perspective view of a first inner fixed sleeve of a dis-engageable valve handle assembly of a railway tank car of another example embodiment of the present disclosure.
Figure 22:
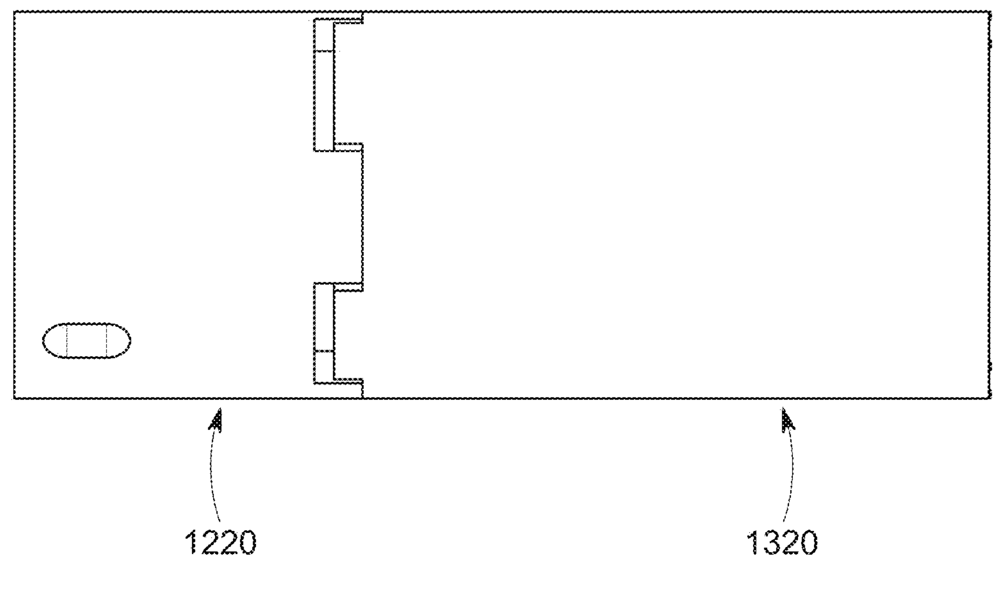
FIG. 22 is a side view of the valve stem adapter of FIG. 19 and the first inner fixed sleeve of FIG. 21.

The discharge valve assembly 150 also includes an inwardly and outwardly movable and rotatably movable valve stem adapter 220 best shown in FIGS. 6, 7, 8, 14A-14D, 17A-17D, and 18A-18D. The valve stem adapter 220 includes two fixedly connected sections and specifically: (1) a valve stem receiver 230; and (2) a handle shaft receiver 250 fixedly connected to the valve stem receiver 230. An alternative valve stem adapter 1220 for the discharge valve assembly 150 is described below and shown in FIGS. 19, 20, and 22.

The valve stem adapter 220 is made from steel in this example embodiment, but can be made from other suitable materials in accordance with the present disclosure. The valve stem adapter can be alternatively sized, shaped, and otherwise configured in accordance with the present disclosure.

The valve stem receiver 230 includes a cylindrical solid body that includes a plurality of inner shaft engagement walls (not labeled) that define a valve stem receiving pocket 236. The valve stem receiving pocket 236 is configured to receive the valve stem 164 such that rotation of the valve stem adapter 220 causes rotation of the valve stem 164 in the same rotational direction as rotation of the valve stem adapter 220. In other words, the inner shaft engagement walls (not labeled) are configured to engage the outer walls (not labeled) of the valve stem 164.

The body of the valve stem receiver 230 of the valve stem adapter 220 includes a plurality of transversely extending inner securement pin engagement walls (not labeled) that define a transversely extending securement pin receiving channel that has two aligned spaced-apart sections 242*a* and 242*b* that are respectively sized, shaped, and otherwise configured to receive a securement pin such as locking roll pin 243. The locking roll pin 243 extends through the sections 242*a* and 242*b* of the transversely extending securement pin receiving channel of the valve stem receiver 230 and through the valve stem 164 to secure the valve stem receiver 230 to the valve stem 164. The sections 242*a* and 242*b* of the transversely extending securement pin receiving channel of the valve stem receiver 230 are slotted or oval to enable the relative inward and outward movements of the valve stem receiver 230 to the valve stem 164.

Figure 7:
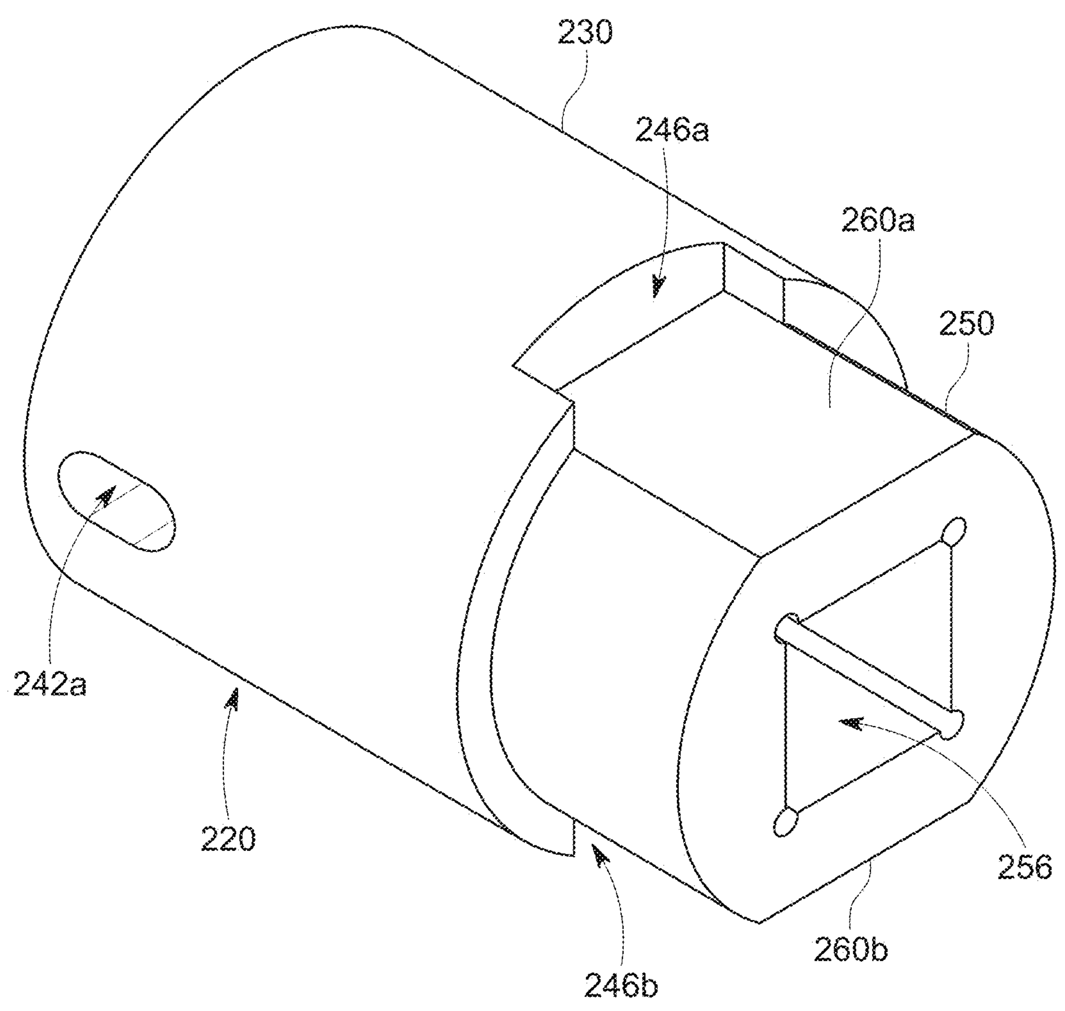
FIG. 7 is a first perspective view of the valve stem adapter of the dis-engageable valve handle assembly of the railway tank car of FIG. 1, shown removed from the railway tank car.
Figure 8:
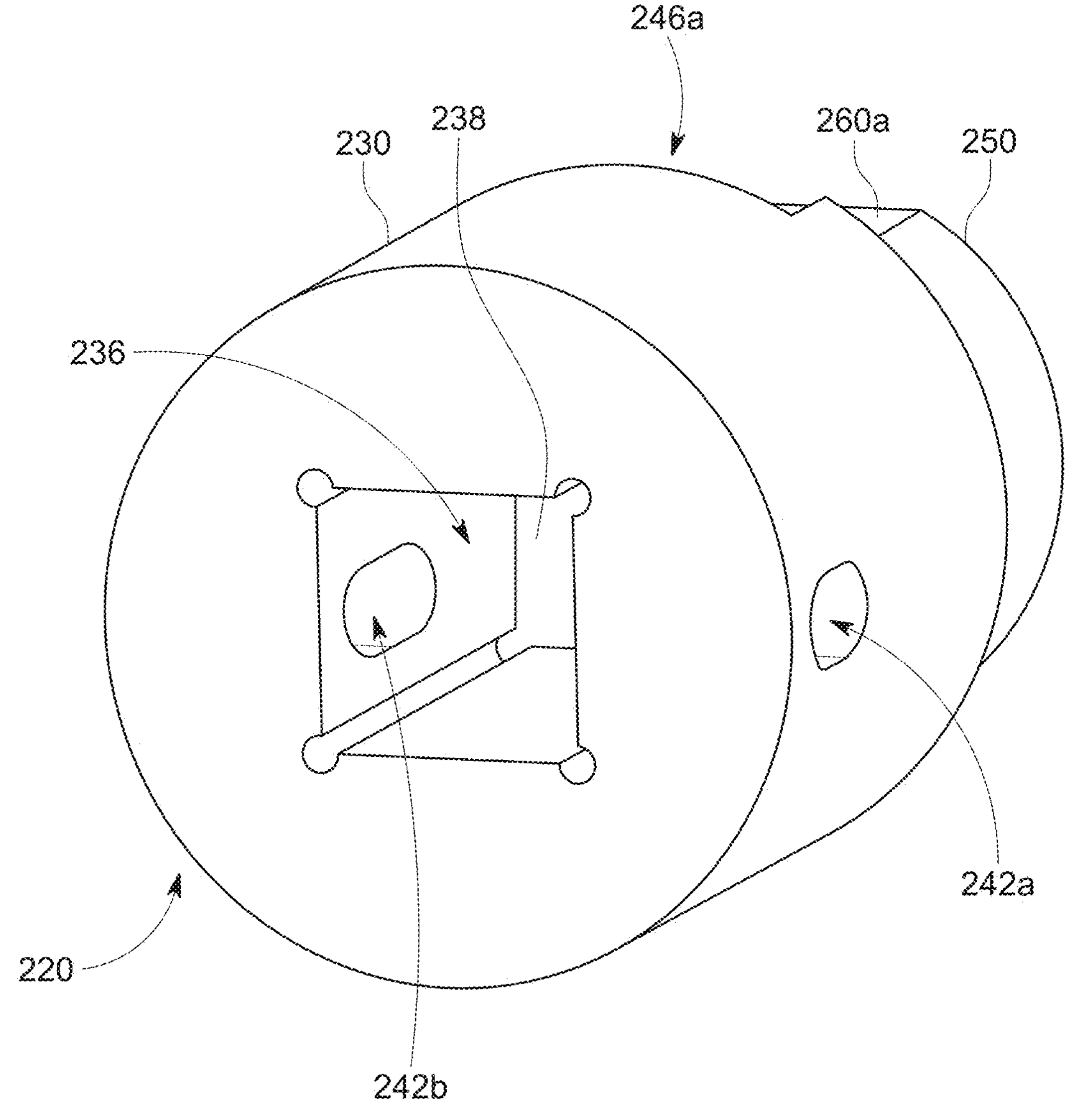
FIG. 8 is a second perspective view of the valve stem adapter of the dis-engageable valve handle assembly of the railway tank car of FIG. 1, shown removed from the railway tank car.
Figure 9:
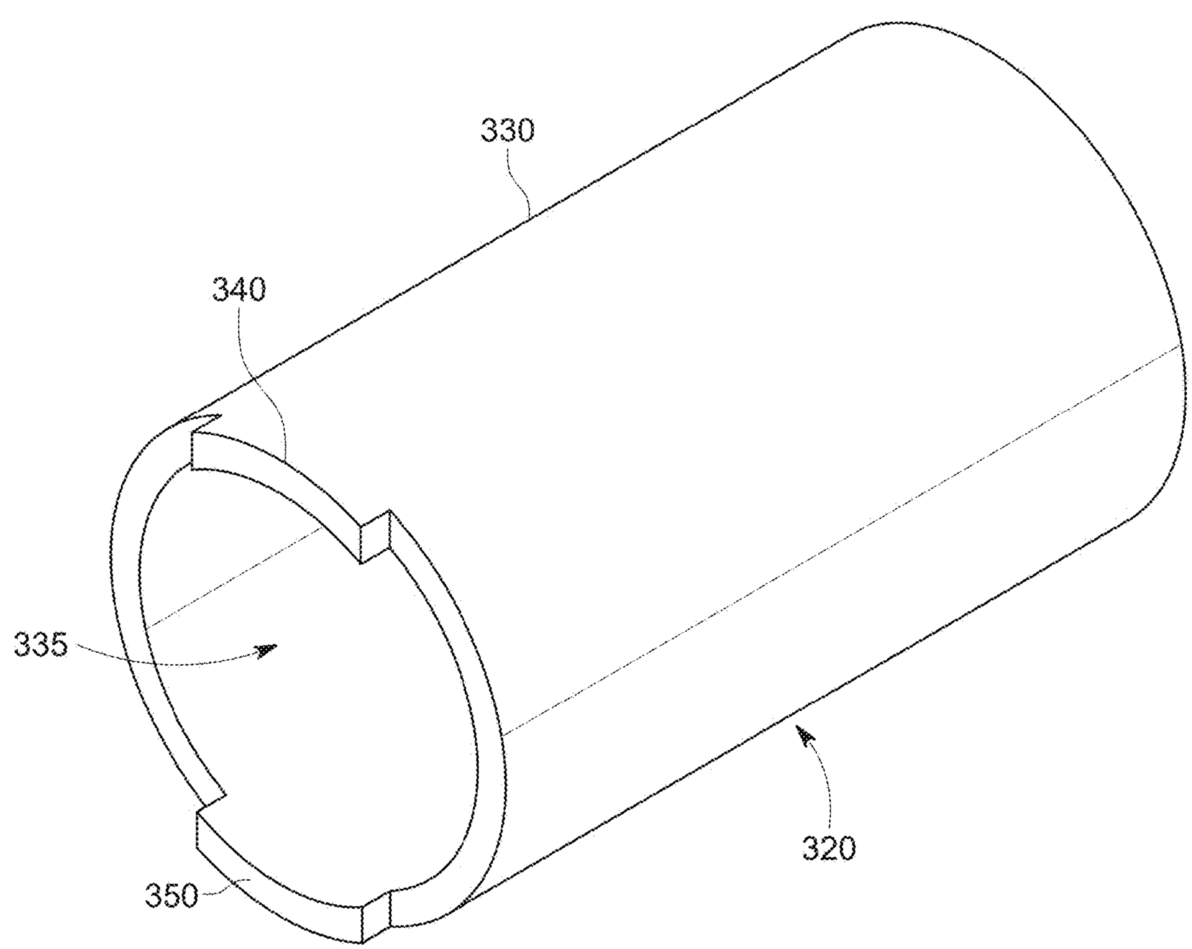
FIG. 9 is a perspective view of the first inner fixed sleeve of the dis-engageable valve handle assembly of the railway tank car of FIG. 1, shown removed from the railway tank car.

As best shown in FIG. 7, the body of the valve stem receiver 230 of the valve stem adapter 220 includes a plurality of outer walls that define locking lip receiving pockets 246*a* and 246*b* on opposing sides of the valve stem receiver 230. The locking lip receiving pockets 246*a* and 246*b* that are configured to selectively receive opposing spaced-apart locking lips 340 and 350 of the first inner fixed sleeve 320 such as shown in FIGS. 5, 14A-14B, 17A-17B, and 18A-18B and as described below.

It should be appreciated that first inner fixed sleeve 320 functions as a locking sleeve as described herein.

In alternative embodiments, the locking lip receiving pockets of the valve stem receiver do not need to be opposing and can be asymmetrical (in position and/or size) to prevent locking in any of the valve open positions (such as further described below with respect to the alternative embodiment shown in FIGS. 19, 20, 21, and 22).

It should also be appreciated that any suitable quantity of pockets and locking lips can be employed in accordance with the present disclosure.

It should also be appreciated that the locking lip receiving pockets can be employed in the first inner fixed sleeve and the locking lips can be employed in the valve stem in accordance with the present disclosure.

Figure 14A:
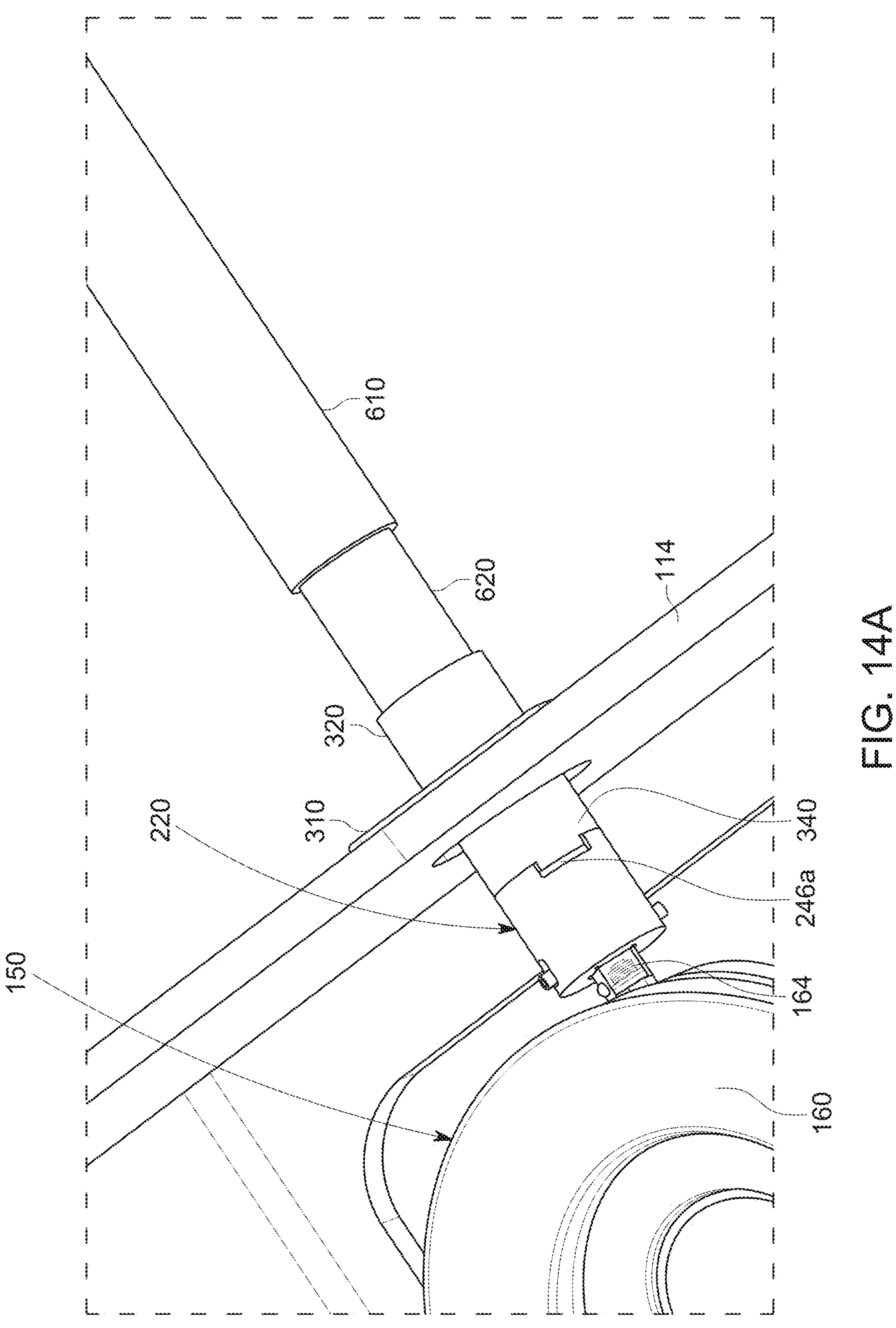
FIG. 14A is a fragmentary perspective view of part of the valve and part of the dis-engageable valve handle assembly of the railway tank car of FIG. 1, shown in a locked, disengaged, and valve closed position.
Figure 14B:
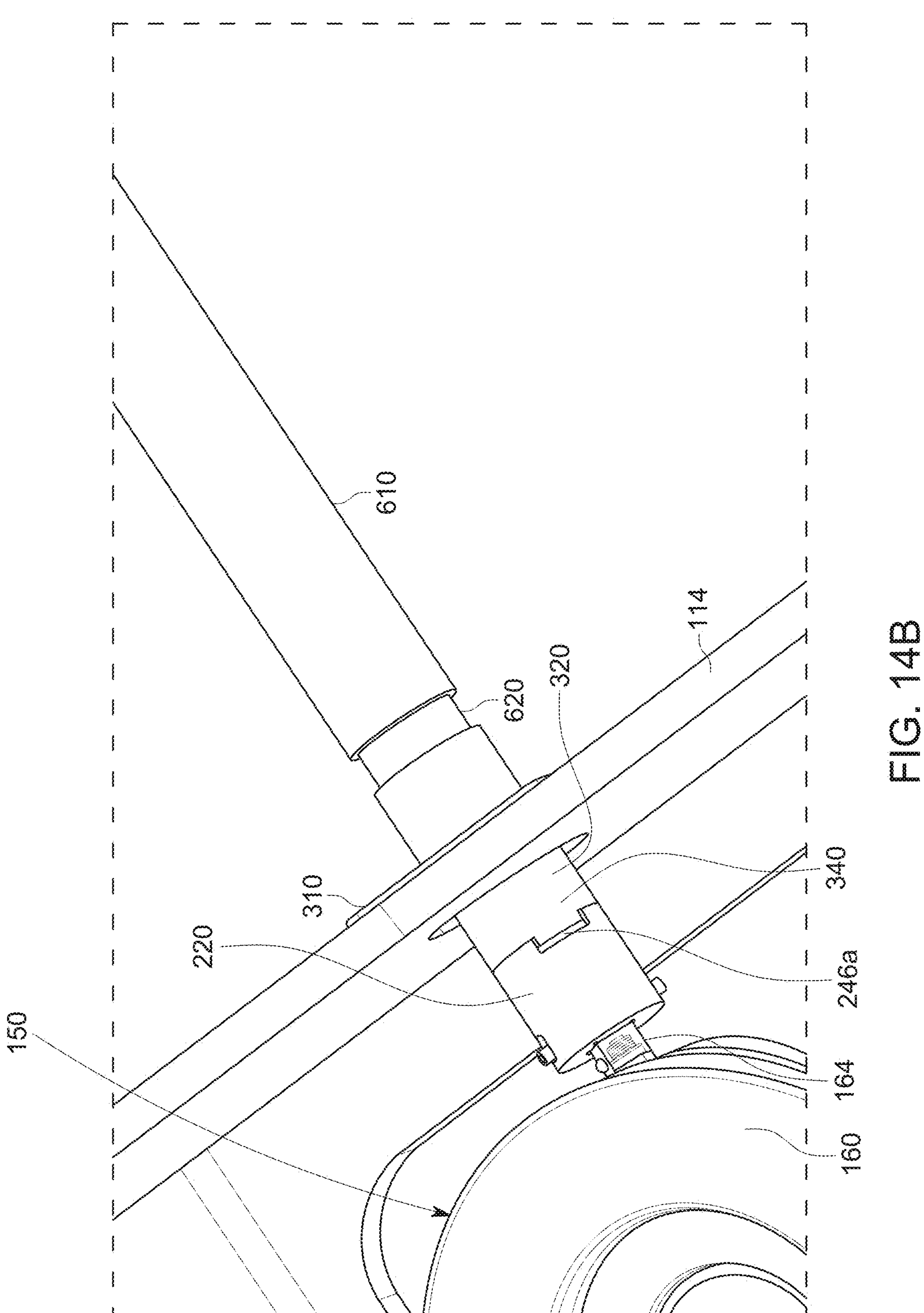
FIG. 14B is a fragmentary perspective view of part of the valve and part of the dis-engageable valve handle assembly of the railway tank car of FIG. 1, shown in a locked, engaged, and valve closed position.
Figure 14C:
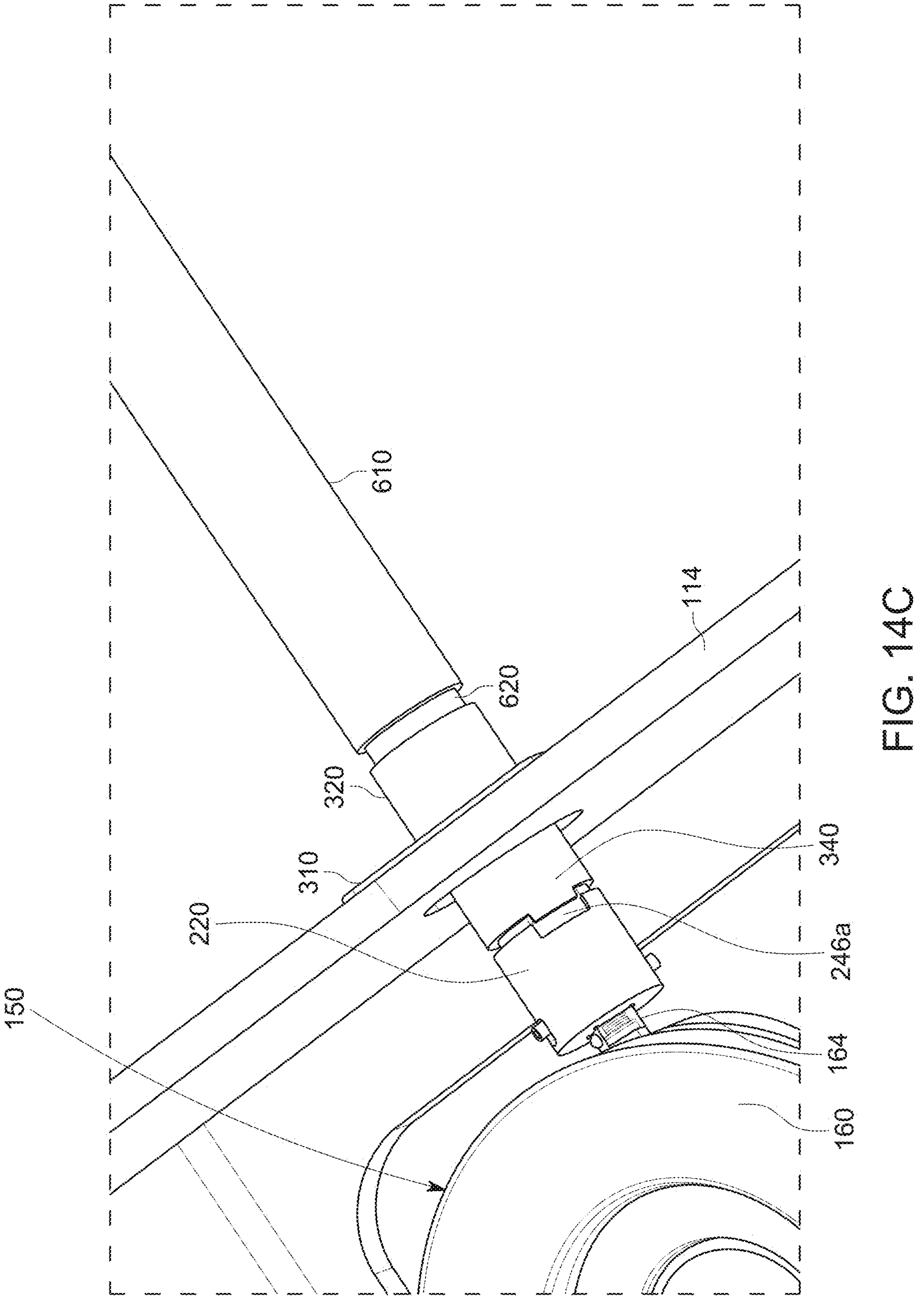
FIG. 14C is a fragmentary perspective view of part of the valve and part of the dis-engageable valve handle assembly of the railway tank car of FIG. 1, shown in an un-locked, engaged, and valve closed position.
Figure 14D:
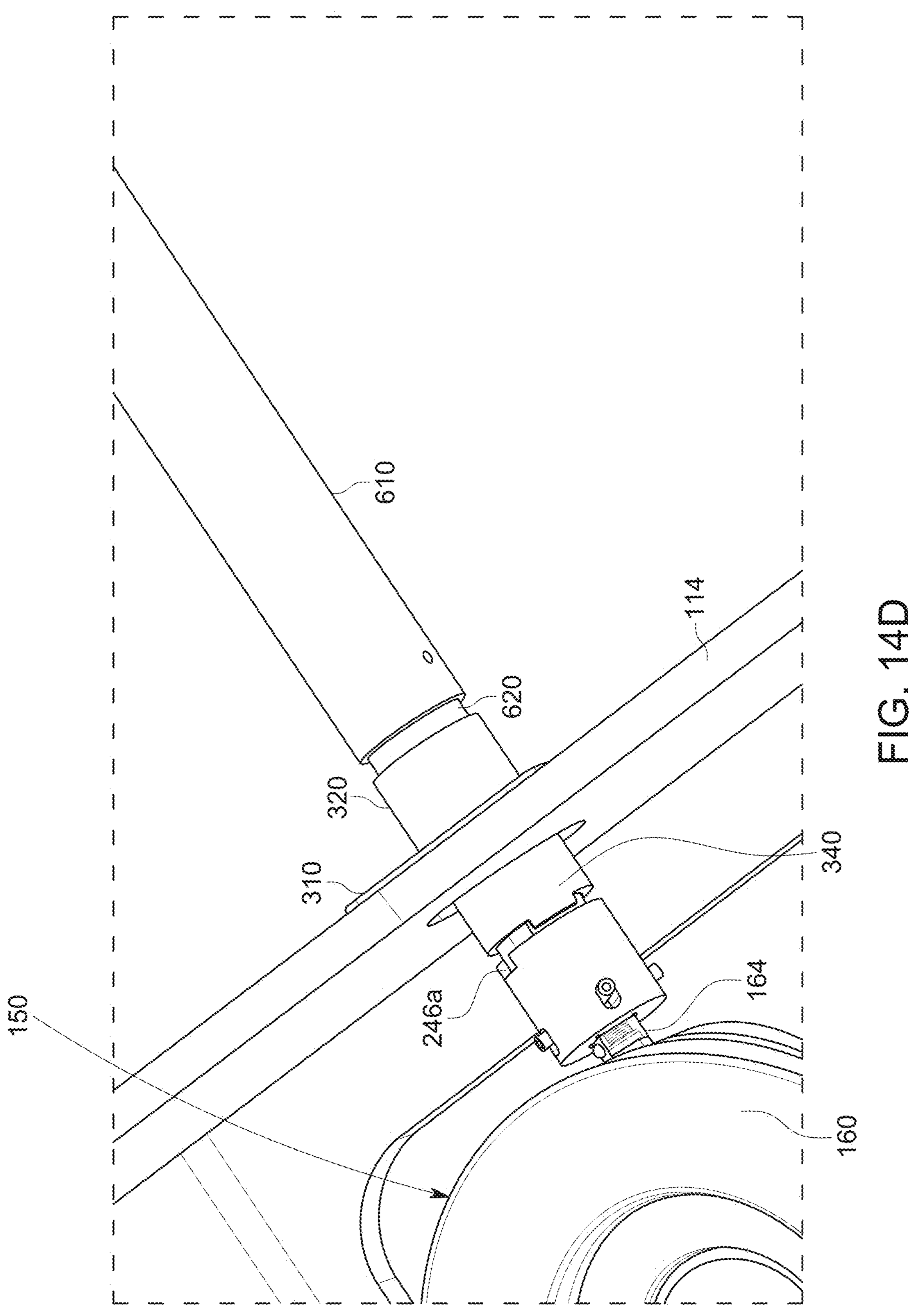
FIG. 14D is a fragmentary perspective view of part of the valve and part of the dis-engageable valve handle assembly of the railway tank car of FIG. 1, shown in an un-locked, engaged, and valve open position.
Figure 15A:
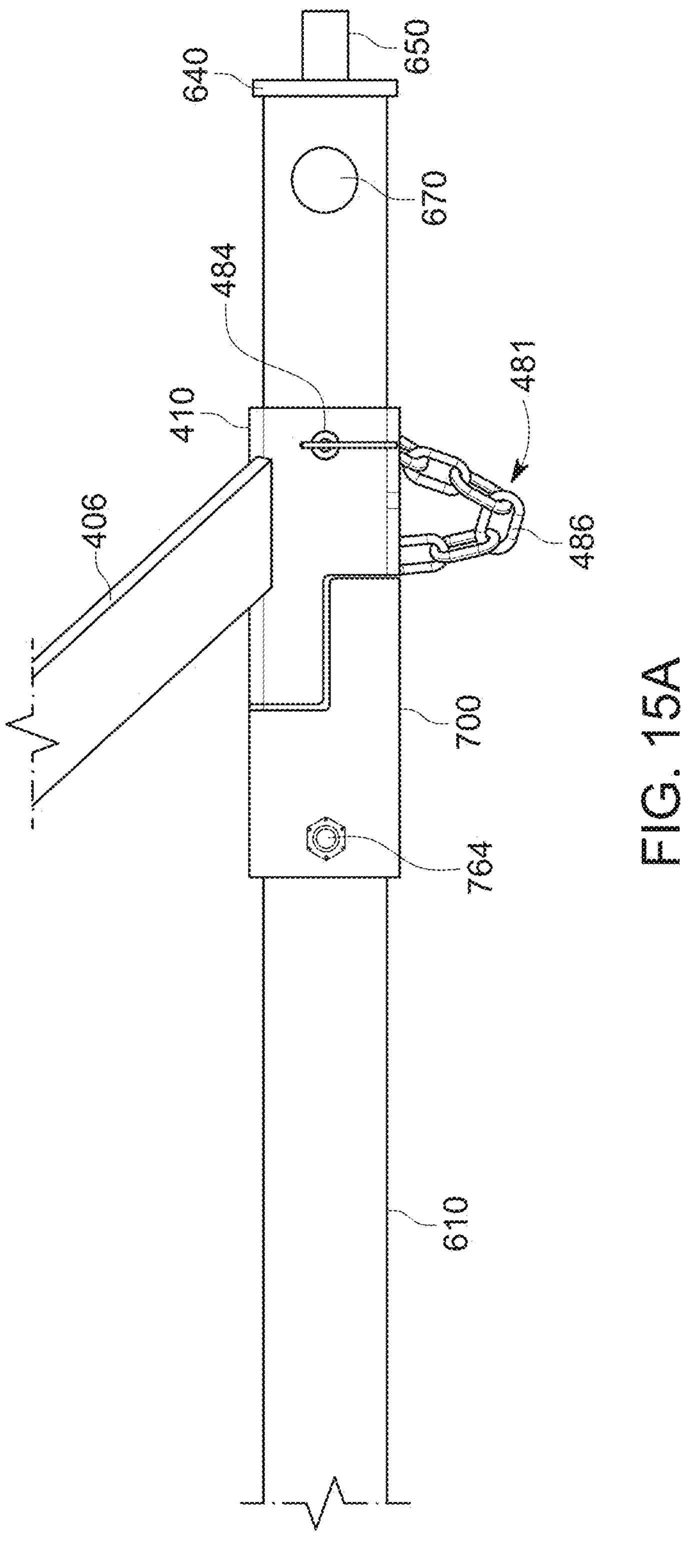
FIG. 15A is a fragmentary side view of part of the dis-engageable valve handle assembly of the railway tank car of FIG. 1, shown in a locked, disengaged, and valve closed position.
Figure 15B:
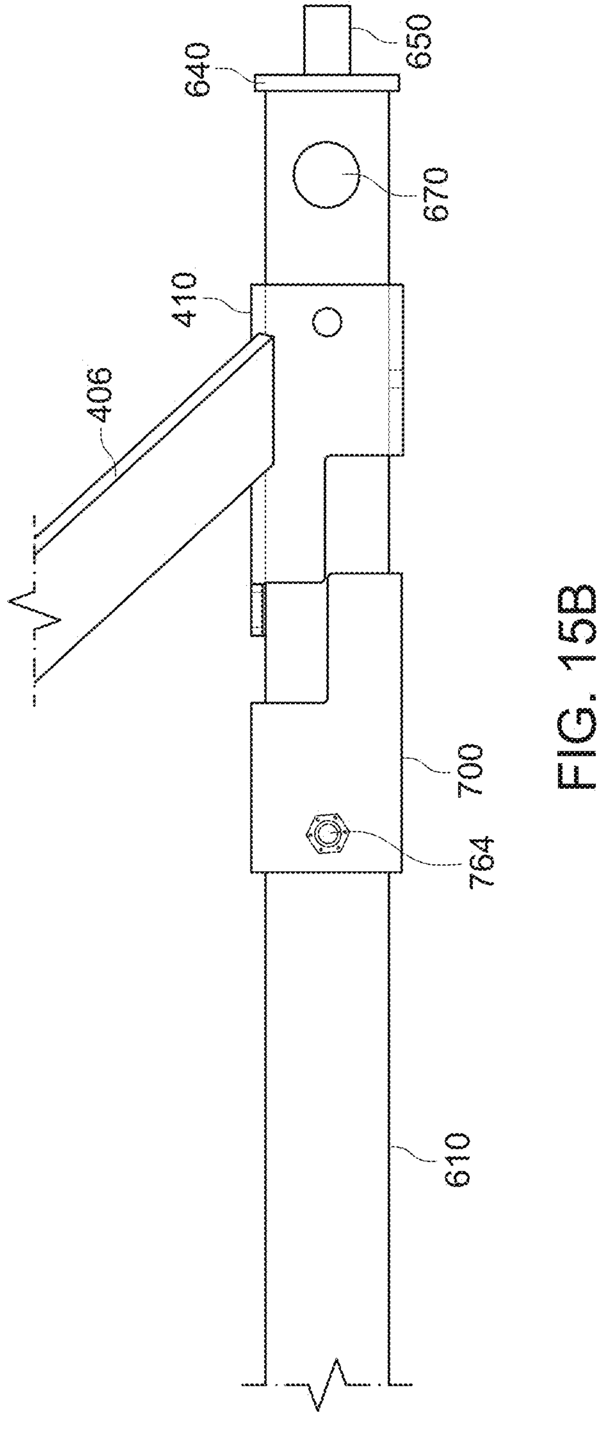
FIG. 15B is a fragmentary side view of part of the dis-engageable valve handle assembly of the railway tank car of FIG. 1, shown in a locked, engaged, and valve closed position.
Figure 15C:
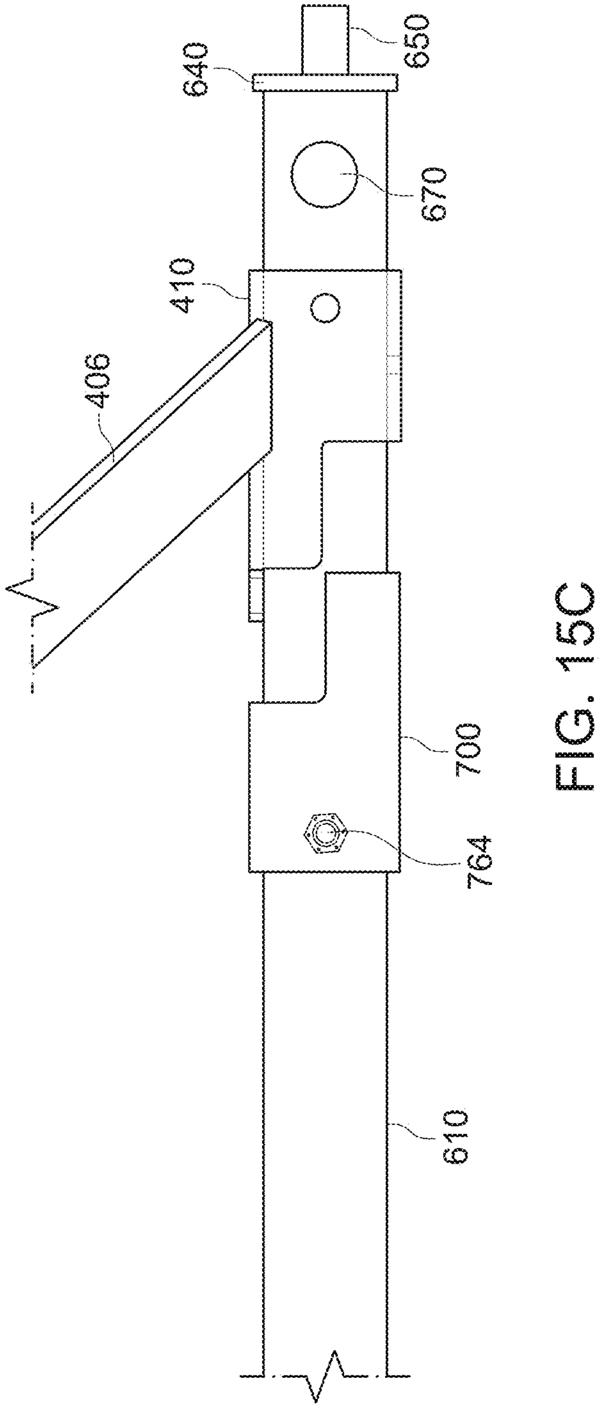
FIG. 15C is a fragmentary side view of part of the dis-engageable valve handle assembly of the railway tank car of FIG. 1, shown in an un-locked, engaged, and valve closed position.
Figure 15D:
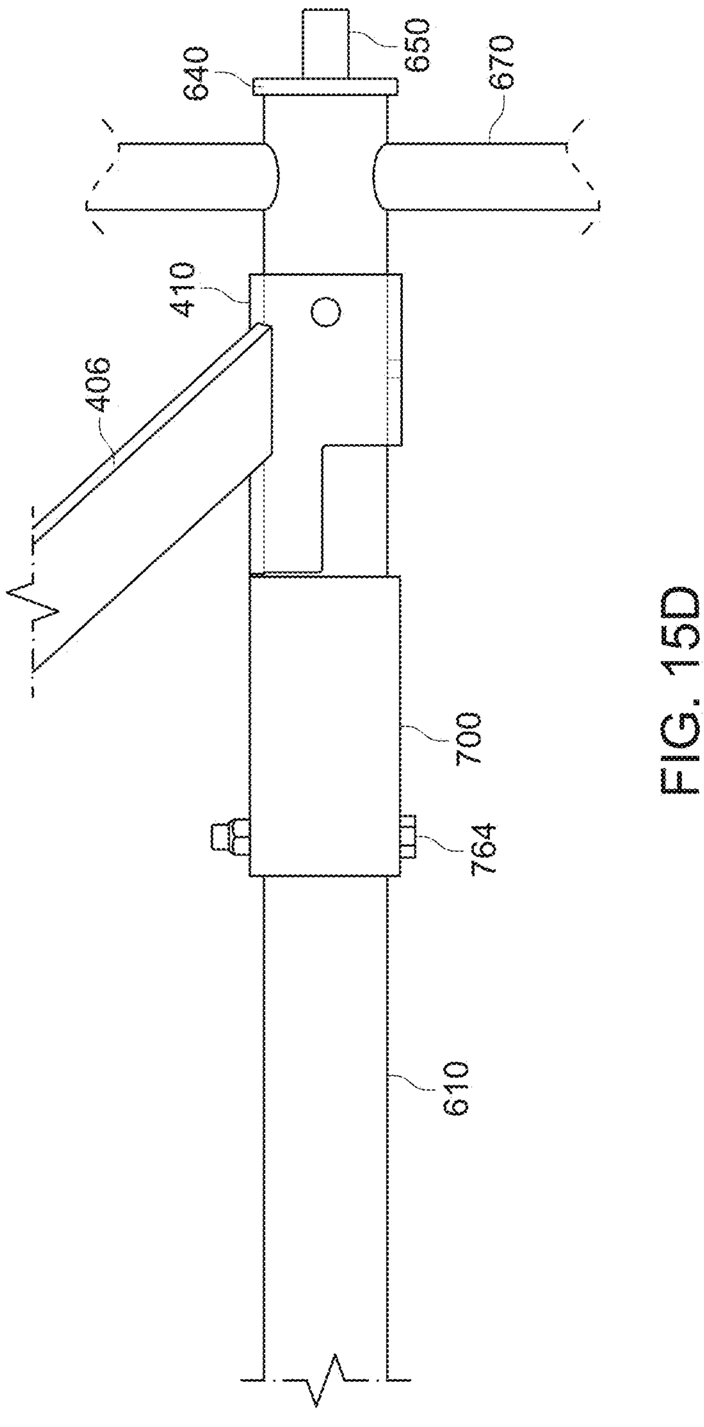
FIG. 15D is a fragmentary side view of part of the dis-engageable valve handle assembly of the railway tank car of FIG. 1, shown in an un-locked, engaged, and valve open position.
Figure 16A:
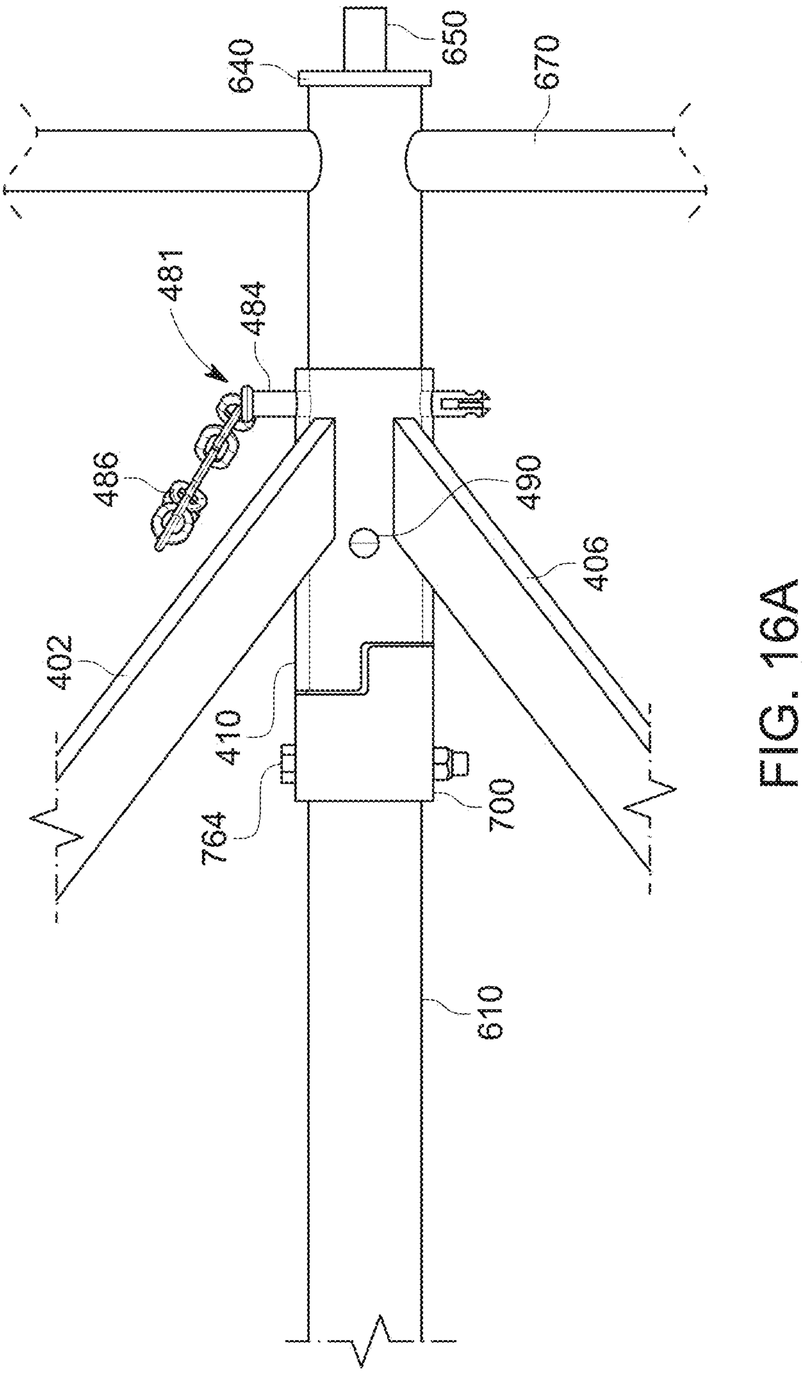
FIG. 16A is a fragmentary top view of part of the dis-engageable valve handle assembly of the railway tank car of FIG. 1, shown in a locked, disengaged, and valve closed position.
Figure 16B:
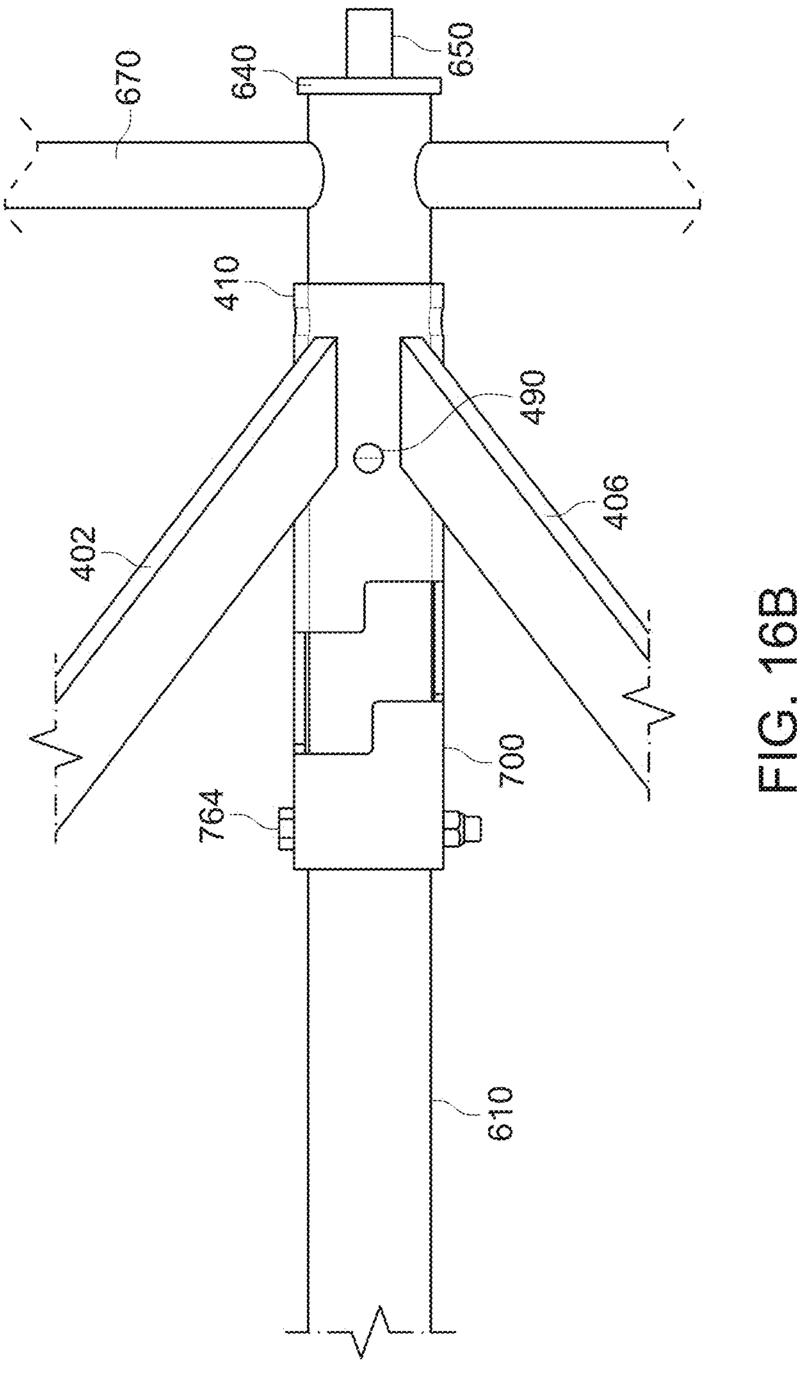
FIG. 16B is a fragmentary top view of part of the dis-engageable valve handle assembly of the railway tank car of FIG. 1, shown in a locked, engaged, and valve closed position.
Figure 16C:
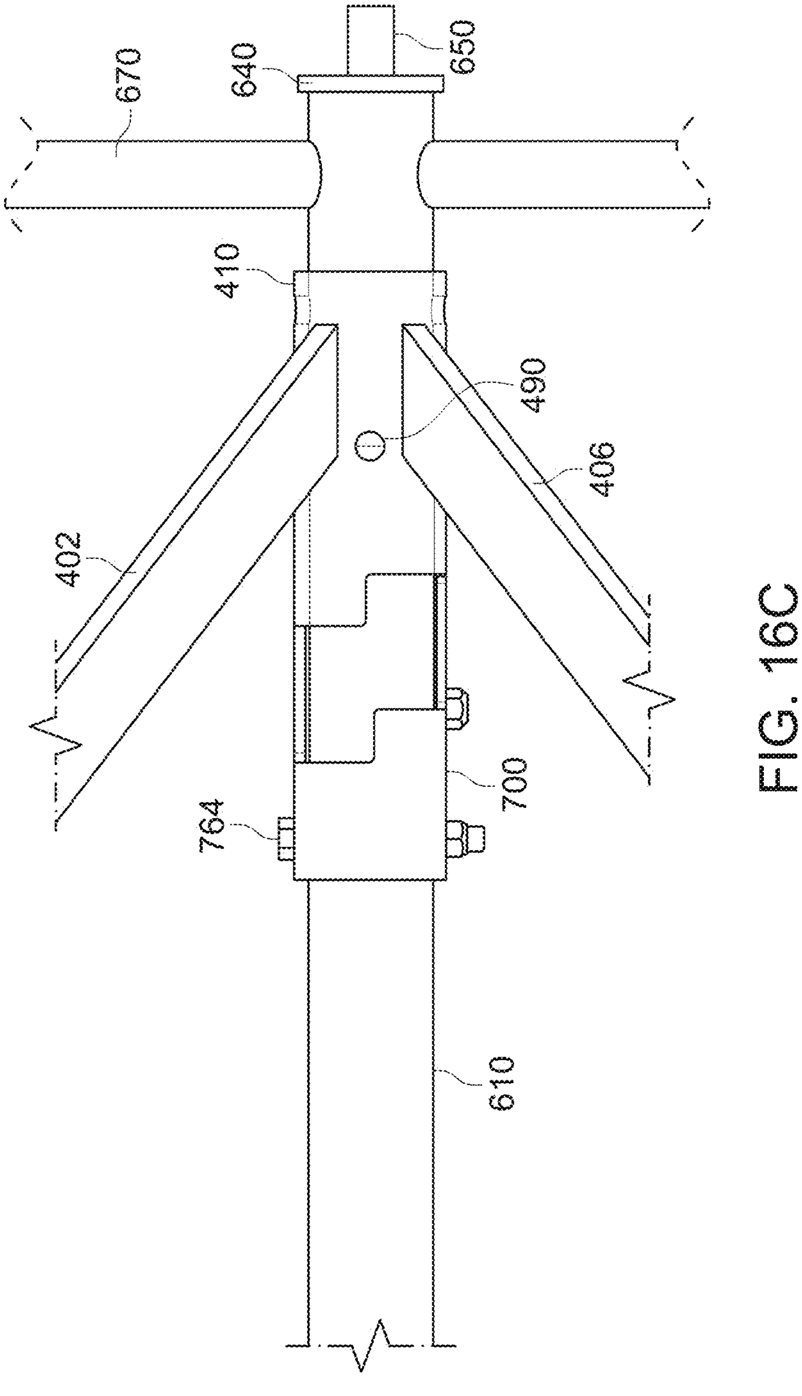
FIG. 16C is a fragmentary top view of part of the dis-engageable valve handle assembly of the railway tank car of FIG. 1, shown in an un-locked, engaged, and valve closed position.
Figure 16D:
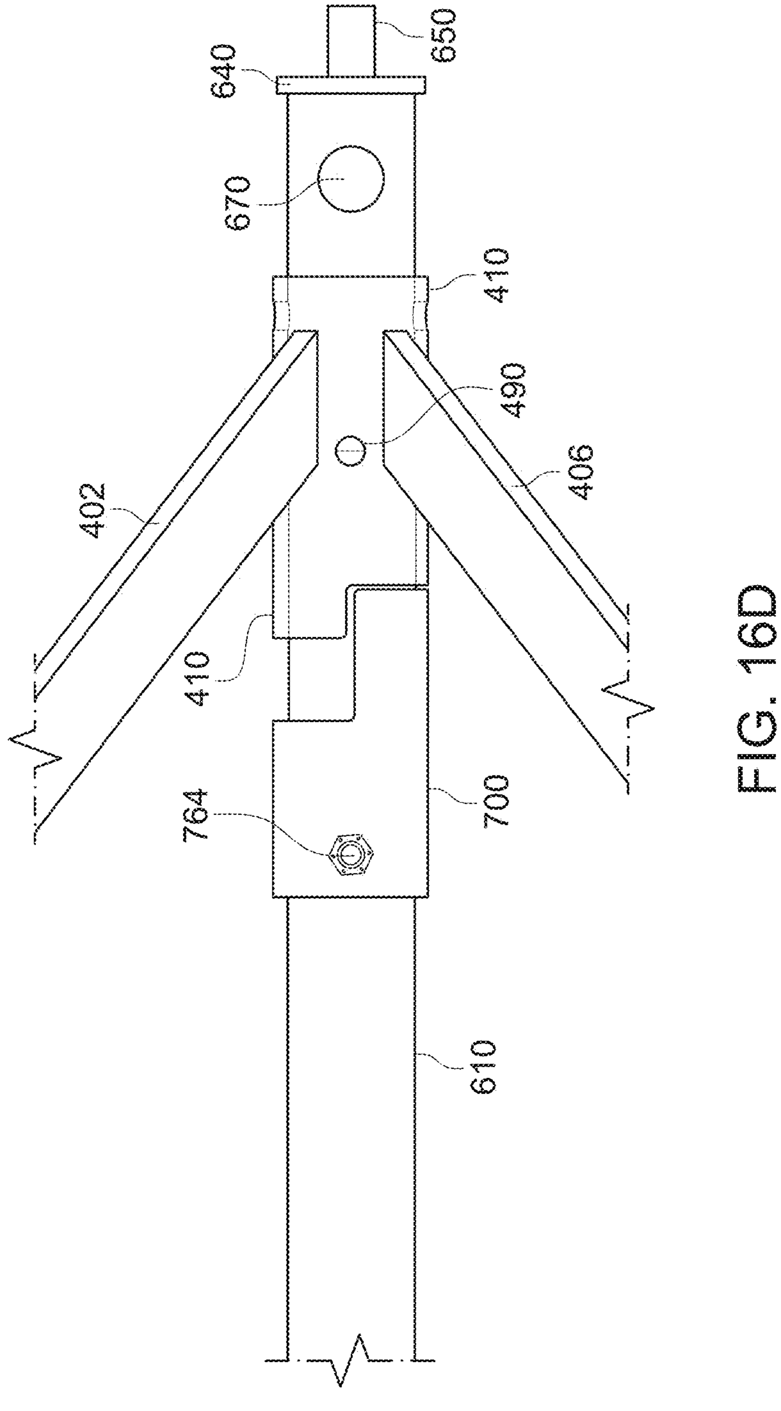
FIG. 16D is a fragmentary top view of part of the dis-engageable valve handle assembly of the railway tank car of FIG. 1, shown in an un-locked, engaged, and valve open position.
Figure 17A:
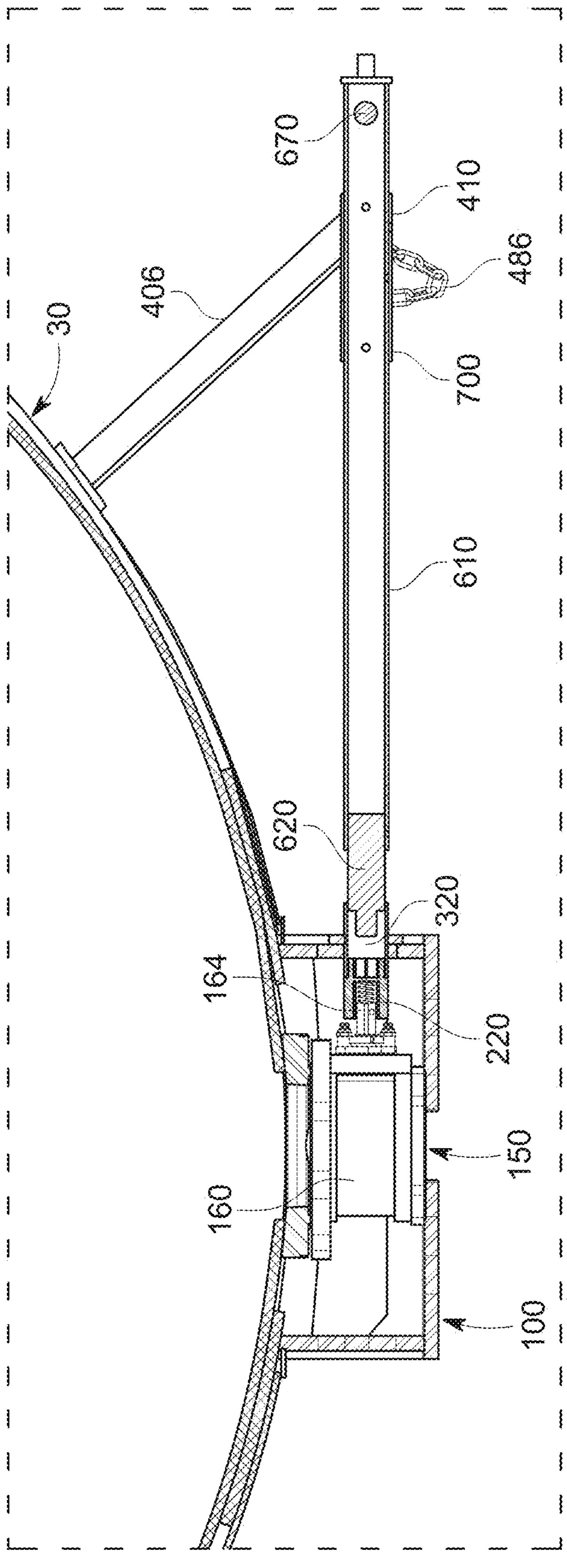
FIG. 17A is a fragmentary cross-sectional view of part of the tank, the valve, part of the valve protective enclosure, and part of the dis-engageable valve handle assembly of the railway tank car of FIG. 1, shown in a locked, disengaged, and valve closed position.
Figure 17B:
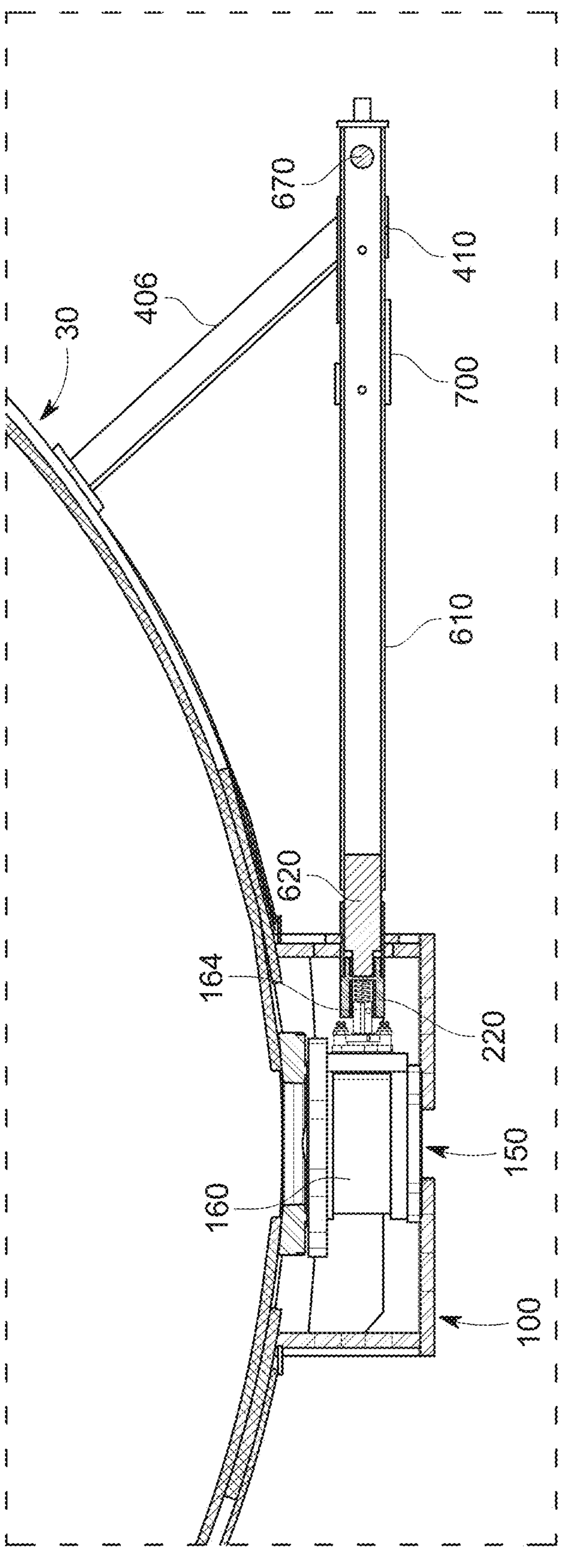
FIG. 17B is a fragmentary cross-sectional view of part of the tank, the valve, part of the valve protective enclosure, and part of the dis-engageable valve handle assembly of the railway tank car of FIG. 1, shown in a locked, engaged, and valve closed position.
Figure 17C:
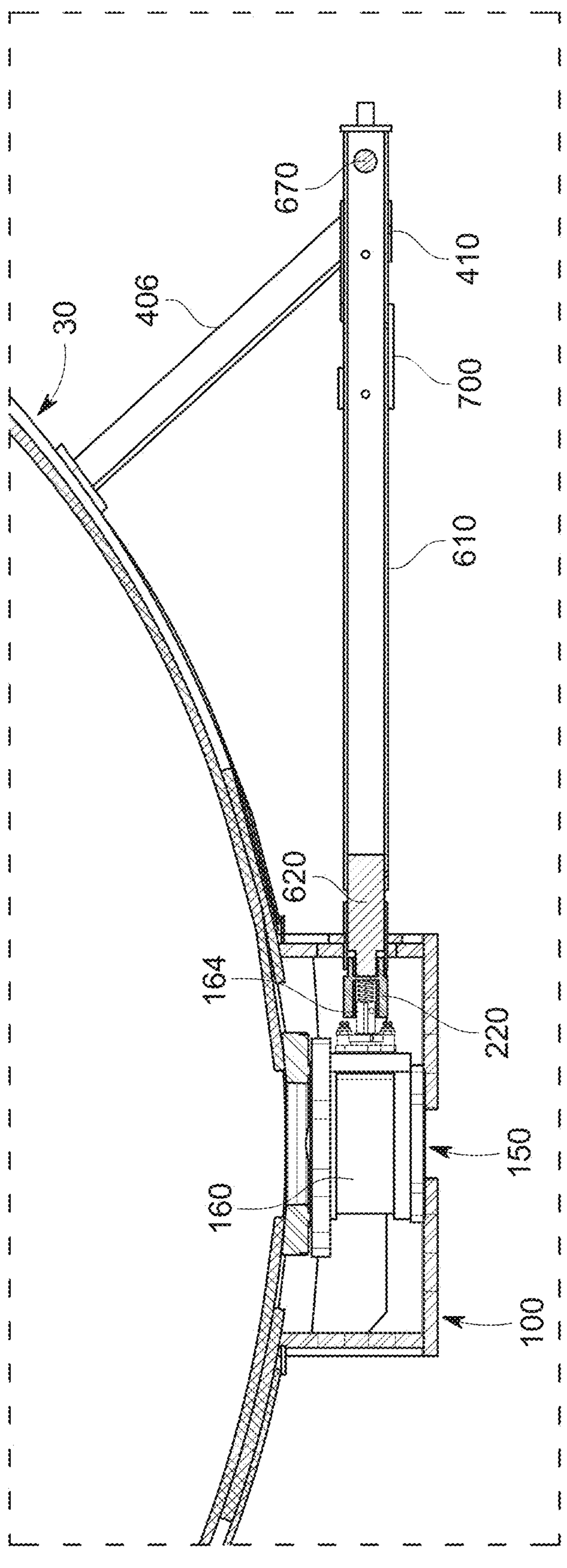
FIG. 17C is a fragmentary cross-sectional view of part of the tank, the valve, part of the valve protective enclosure, and part of the dis-engageable valve handle assembly of the railway tank car of FIG. 1, shown in an un-locked, engaged, and valve closed position.
Figure 17D:
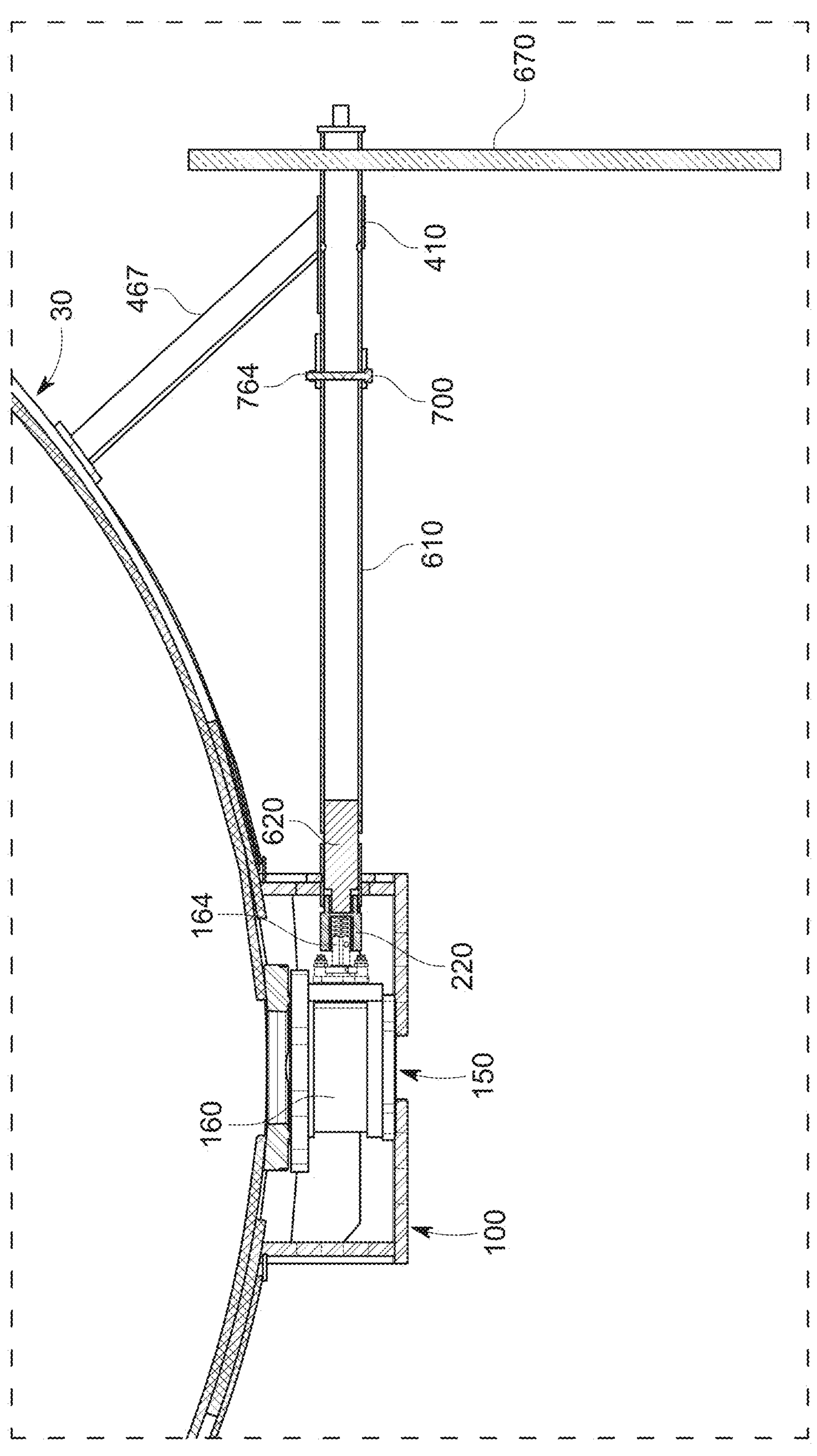
FIG. 17D is a fragmentary cross-sectional view of part of the tank, the valve, part of the valve protective enclosure, and part of the dis-engageable valve handle assembly of the railway tank car of FIG. 1, shown in an un-locked, engaged, and valve open position.
Figure 18A:
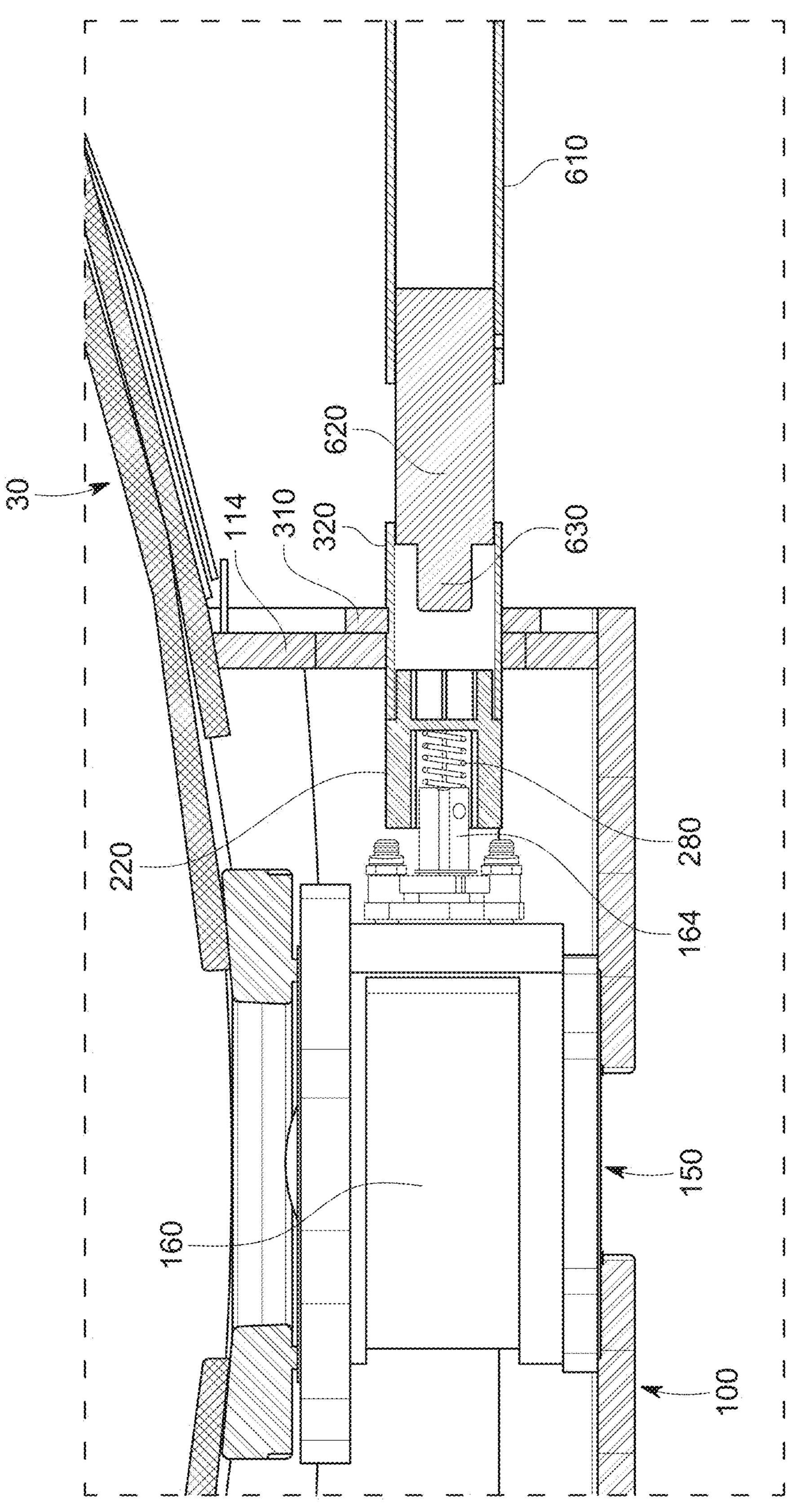
FIG. 18A is an enlarged fragmentary cross-sectional view of part of the tank, the valve, part of the valve protective enclosure, and part of the dis-engageable valve handle assembly of the railway tank car of FIG. 1, shown in a locked, disengaged, and valve closed position.
Figure 18B:
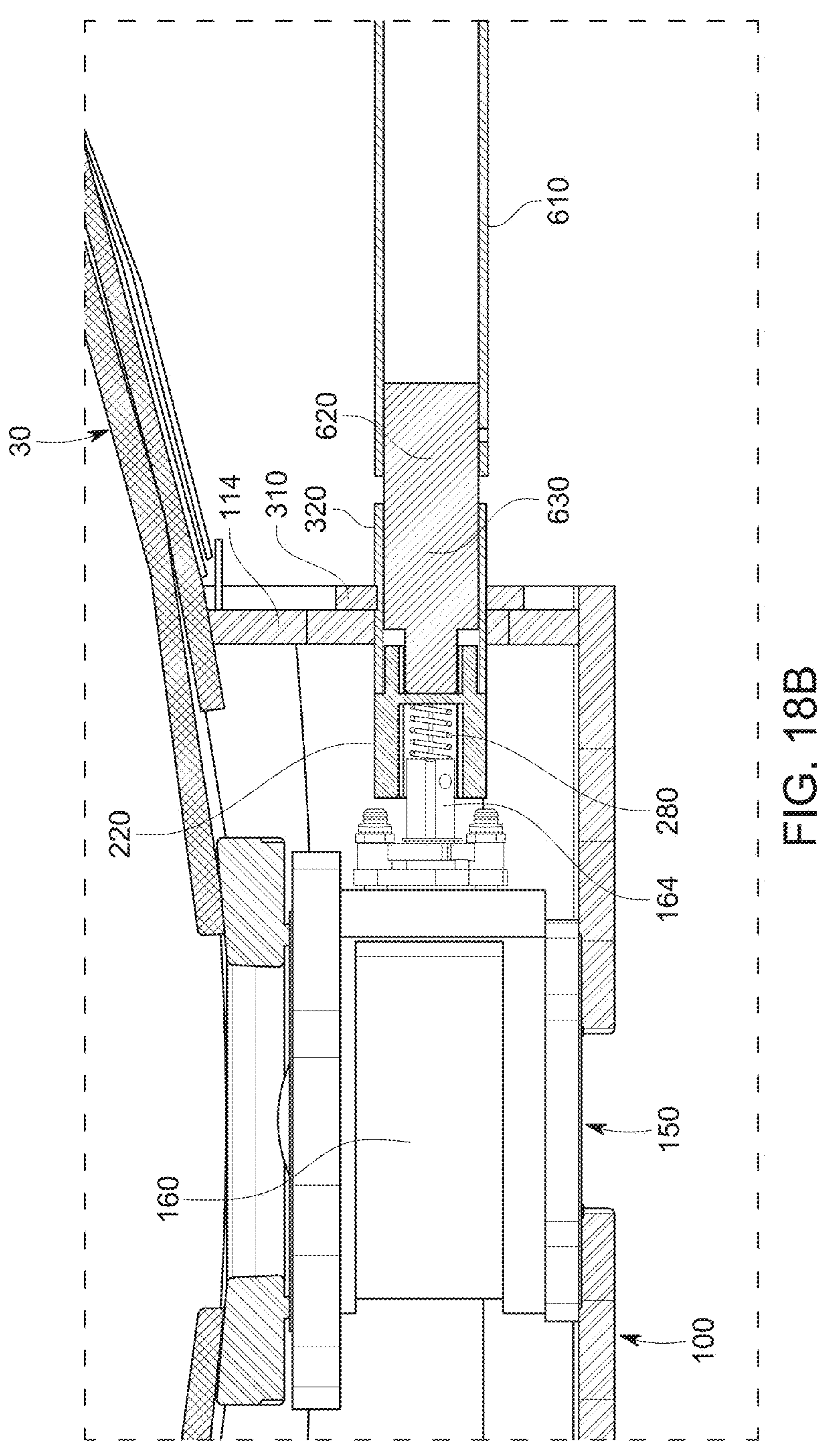
FIG. 18B is an enlarged fragmentary cross-sectional view of part of the tank, the valve, part of the valve protective enclosure, and part of the dis-engageable valve handle assembly of the railway tank car of FIG. 1, shown in a locked position and a partially activated position.
Figure 18C:
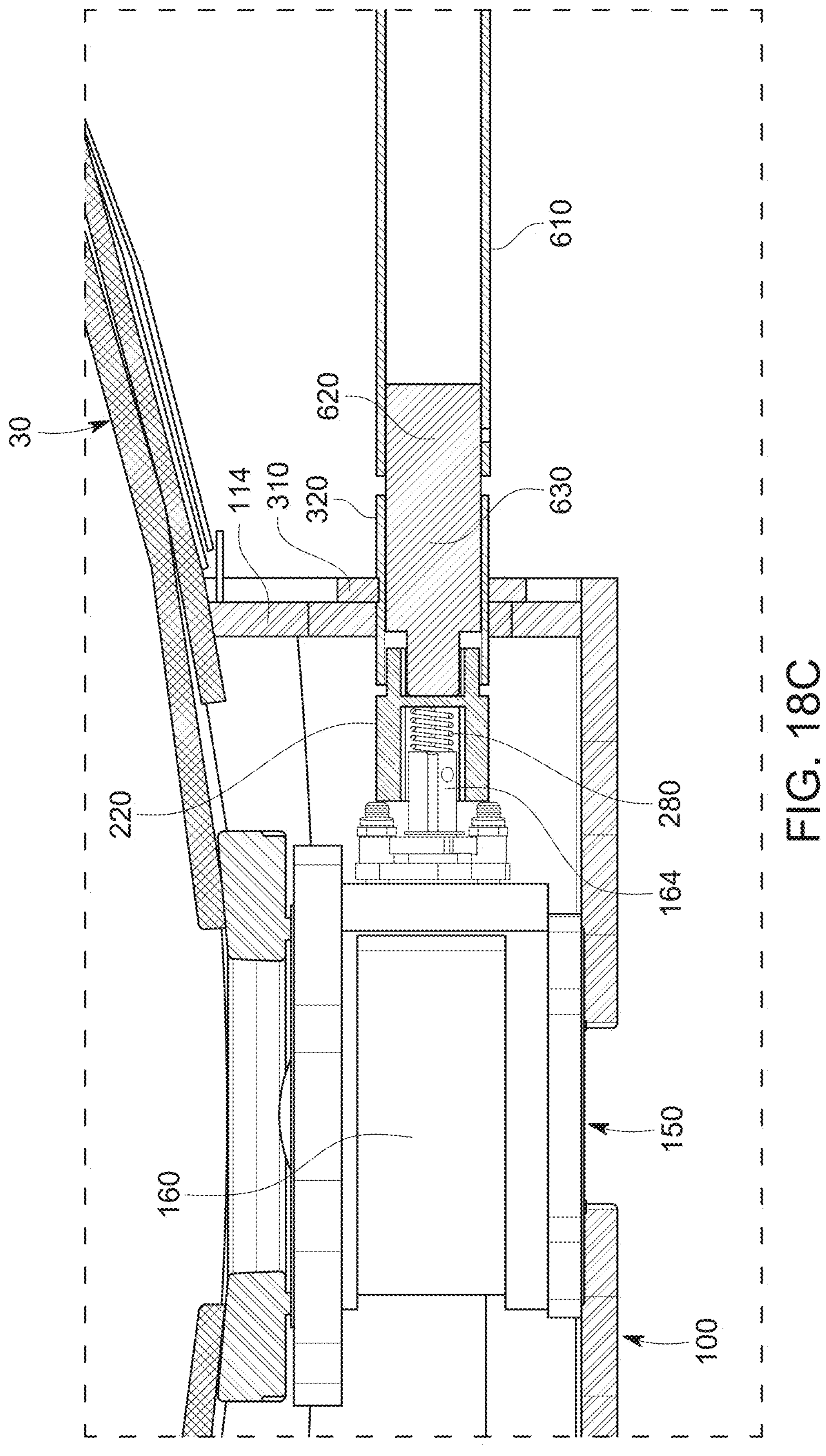
FIG. 18C is an enlarged fragmentary cross-sectional view of part of the tank, the valve, part of the valve protective enclosure, and part of the dis-engageable valve handle assembly of the railway tank car of FIG. 1, shown in a locked position and a fully activated position.
Figure 18D:
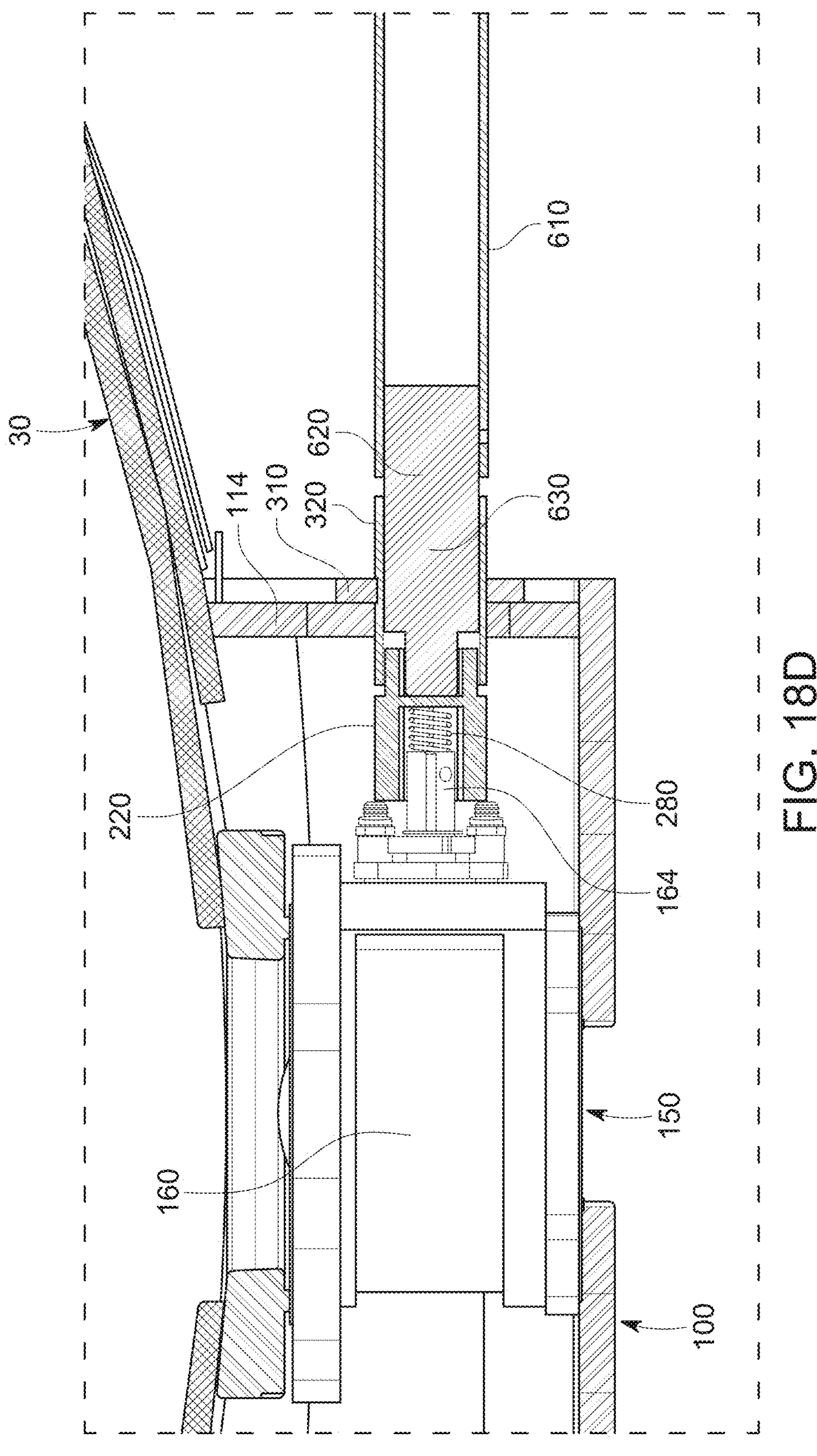
FIG. 18D is an enlarged fragmentary cross-sectional view of part of the tank, the valve, part of the valve protective enclosure, and part of the dis-engageable valve handle assembly of the railway tank car of FIG. 1, shown in an un-locked, engaged, and valve open position.

When the valve stem receiver 230 of the valve stem adapter 220 is moved inwardly toward the valve 160 (such as described below), the locking lips 340 and 350 of the first inner fixed sleeve 320 disengage from being in the locking lip receiving pockets 246*a* and 246*b* of the valve stem receiver 230 such as shown in FIGS. 14C, 17C, and 18C, and enable (do not prevent) rotation of the valve stem receiver 230 and thus of the valve stem adapter 220 such as shown in FIGS. 14D, 17D, and 18D.

Figure 6:
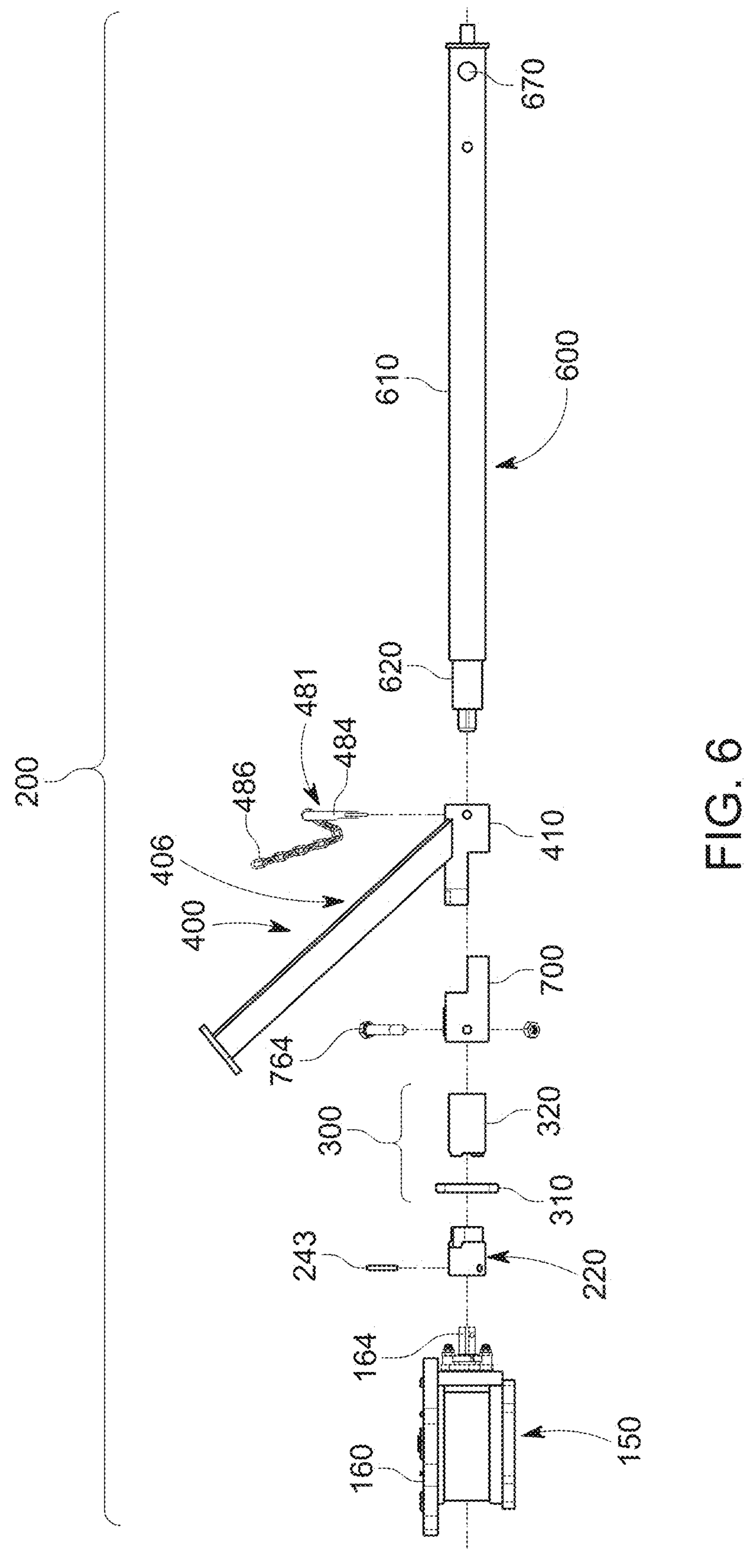
FIG. 6 is an exploded side view of the valve and the dis-engageable valve handle assembly of the railway tank car of FIG. 1, all shown removed from the railway tank car.
Figure 10:
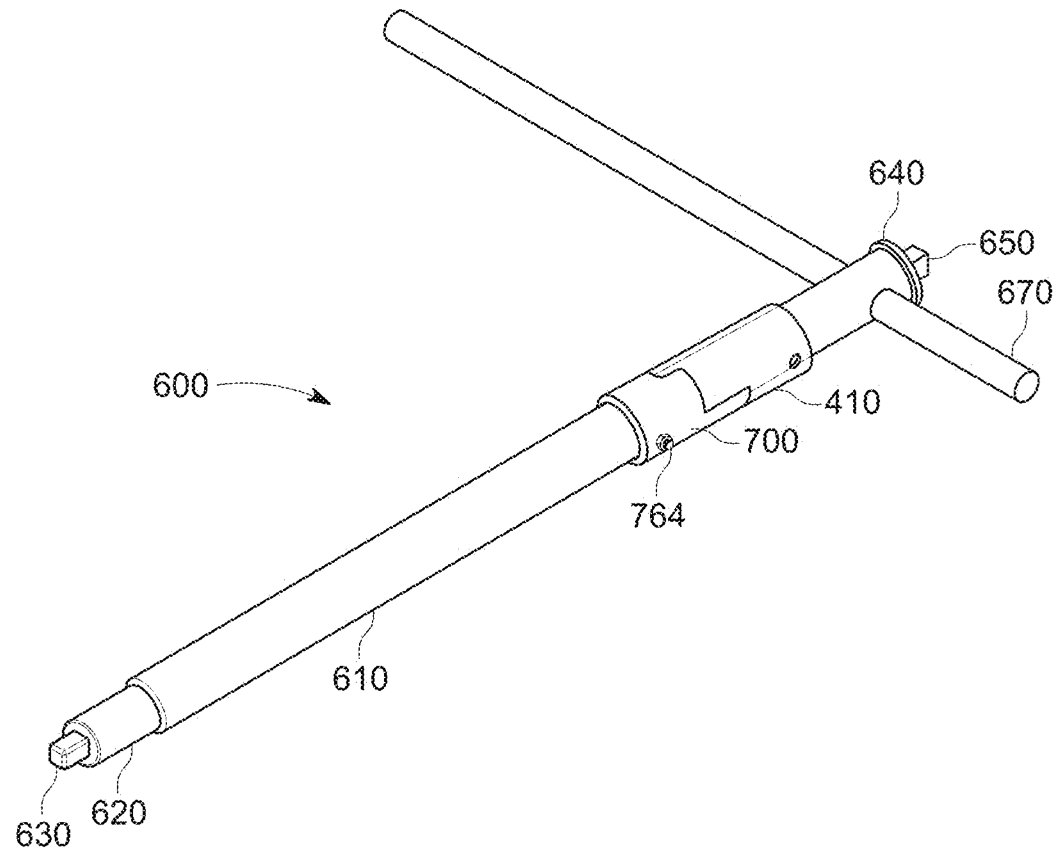
FIG. 10 is a perspective view of part of the dis-engageable valve handle assembly of the railway tank car of FIG. 1, shown removed from the railway tank car.
Figure 11:
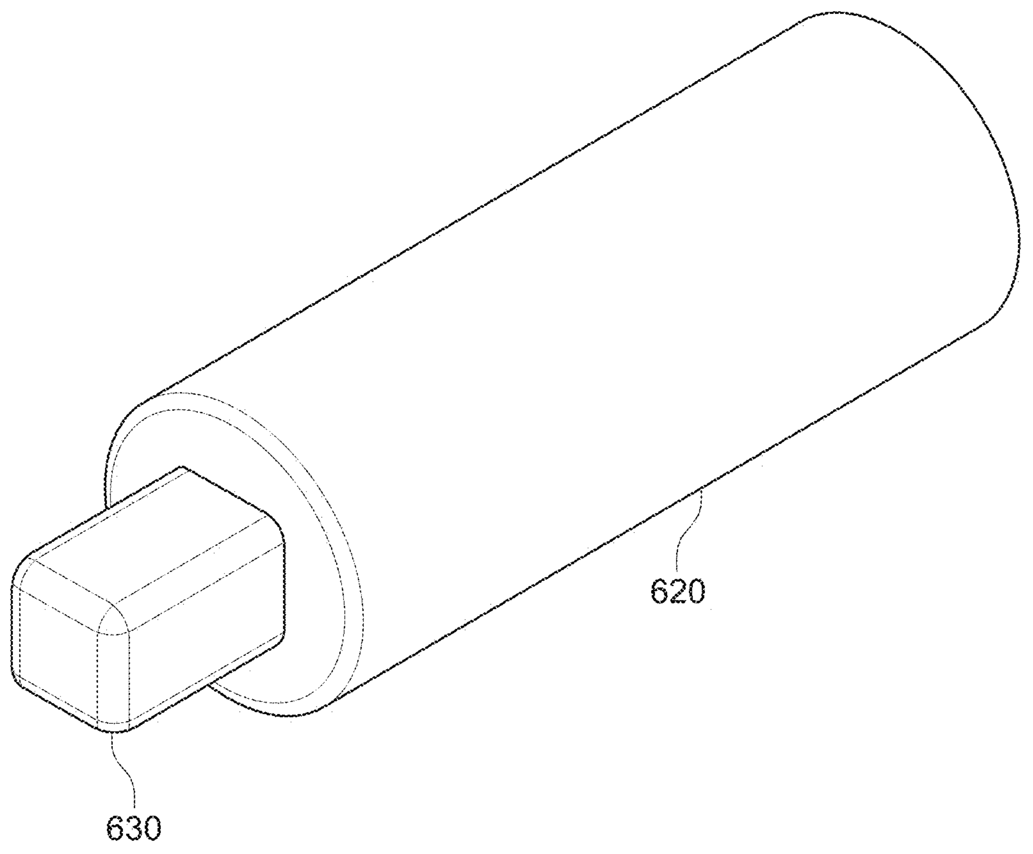
FIG. 11 is a perspective view of the valve stem adapter engager of the dis-engageable valve handle assembly of the railway tank car of FIG. 1, shown removed from the railway tank car.
Figure 12:
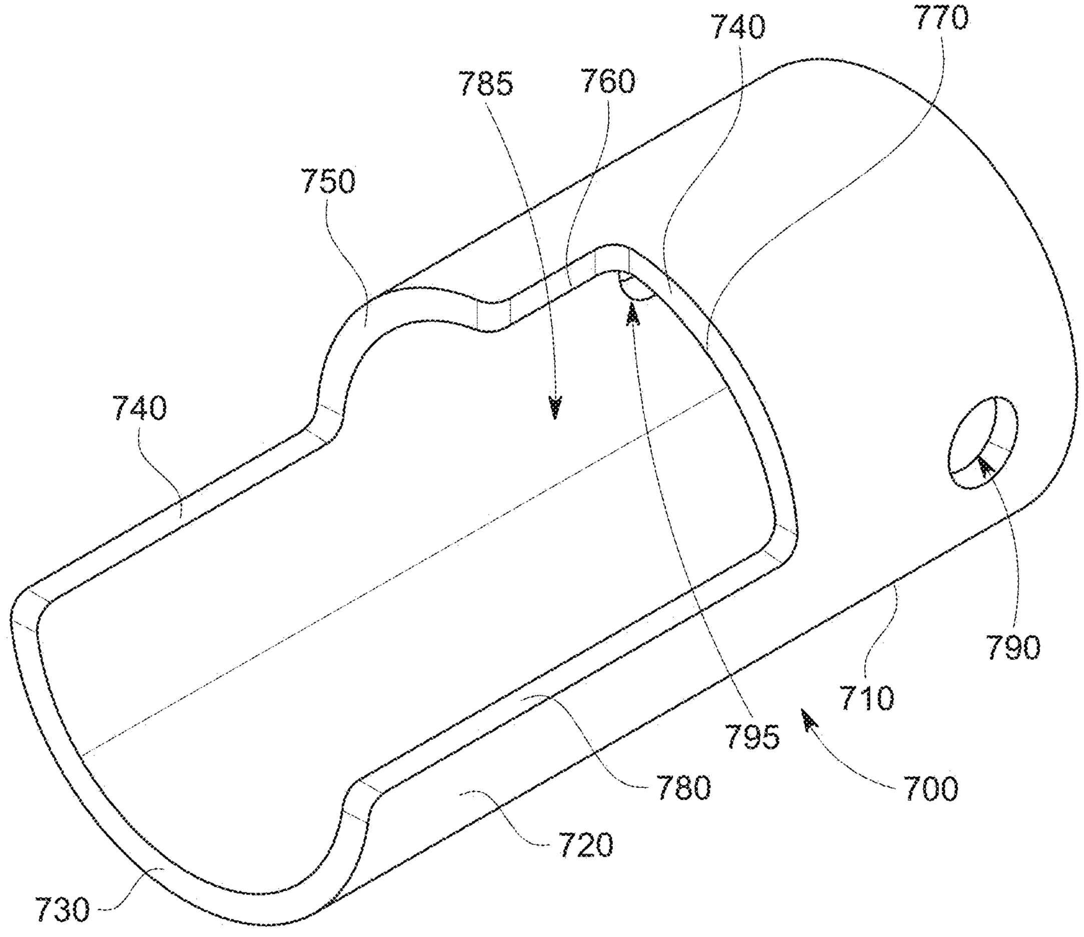
FIG. 12 is a perspective view of a movable and rotatable third sleeve of the dis-engageable valve handle assembly of the railway tank car of FIG. 1, shown removed from the railway tank car.
Figure 13:
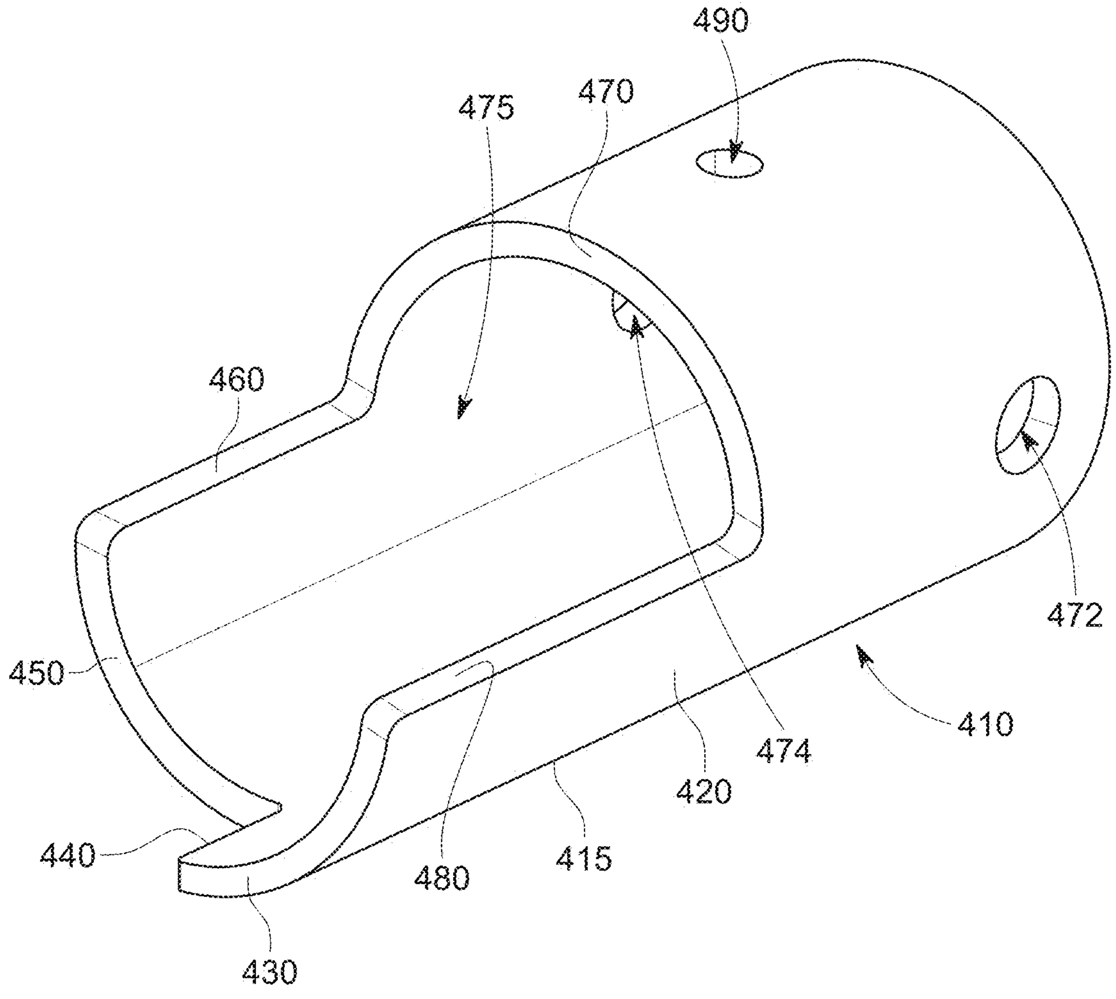
FIG. 13 is a perspective view of a second outer fixed sleeve of the dis-engageable valve handle assembly of the railway tank car of FIG. 1, shown removed from the railway tank car.

As best shown in FIG. 7, the handle shaft receiver 250 of valve stem adapter 220 is fixedly connected (as one piece in this embodiment) to the valve stem receiver 230. The handle shaft receiver 250 includes a plurality of inner shaft engagement walls (not labeled) that define a handle shaft receiving pocket 256. The handle shaft receiving pocket 256 is configured to receive the engager 630 of the valve stem adapter engager 620 of the handle assembly 600 (that is best shown in FIGS. 6, 10, and 11). When the engager 630 of the extension shaft 620 moves inwardly: (1) the engager 630 is received in the handle shaft receiving pocket 256 and causes the handle shaft receiver 250 to move inwardly (against the bias of the spring 280 of the discharge valve assembly 150), (2) which causes the valve stem receiver 230 to move inwardly toward the valve 160, and (3) thus causes the locking lips 340 and 350 of the first inner fixed sleeve 320 to be disengaged from being in the locking lip receiving pockets 246*a* and 246*b* of the valve stem adapter 220, and (4) which enables rotation of the valve stem receiver 230 and thus the entire valve stem adapter 220.

The dis-engageable valve handle assembly 200 also includes: (1) a first handle support and locking assembly 300; (2) a fixed stationary second handle support assembly 400; and (3) a movable and rotatable handle assembly 600.

As best shown in FIGS. 2, 3, 4, 6, 14A-14D, and 18A-18D, the first handle support and locking assembly 300 includes: (1) a support plate 310; and (2) the first inner fixed sleeve 320 (mentioned above). An alternative first inner fixed sleeve 1320 for the discharge valve assembly 150 is described below and shown in FIGS. 21 and 22.

The support plate 310 is fixedly connected to the side wall 114 and is configured to support the first inner fixed sleeve 320. This support plate 310 provides certain flexibility for assembly variations. The position of the valve 160 and/or the discharge valve assembly 150 can be horizontally, vertically, or rotationally inconsistent for various railway tank cars. The support plate 310 provides a vertical and horizontal window that enables the appropriate positioning of the first inner fixed sleeve 320 at desired angles relative to the support plate 310 to accommodate these variations.

Figure 4:
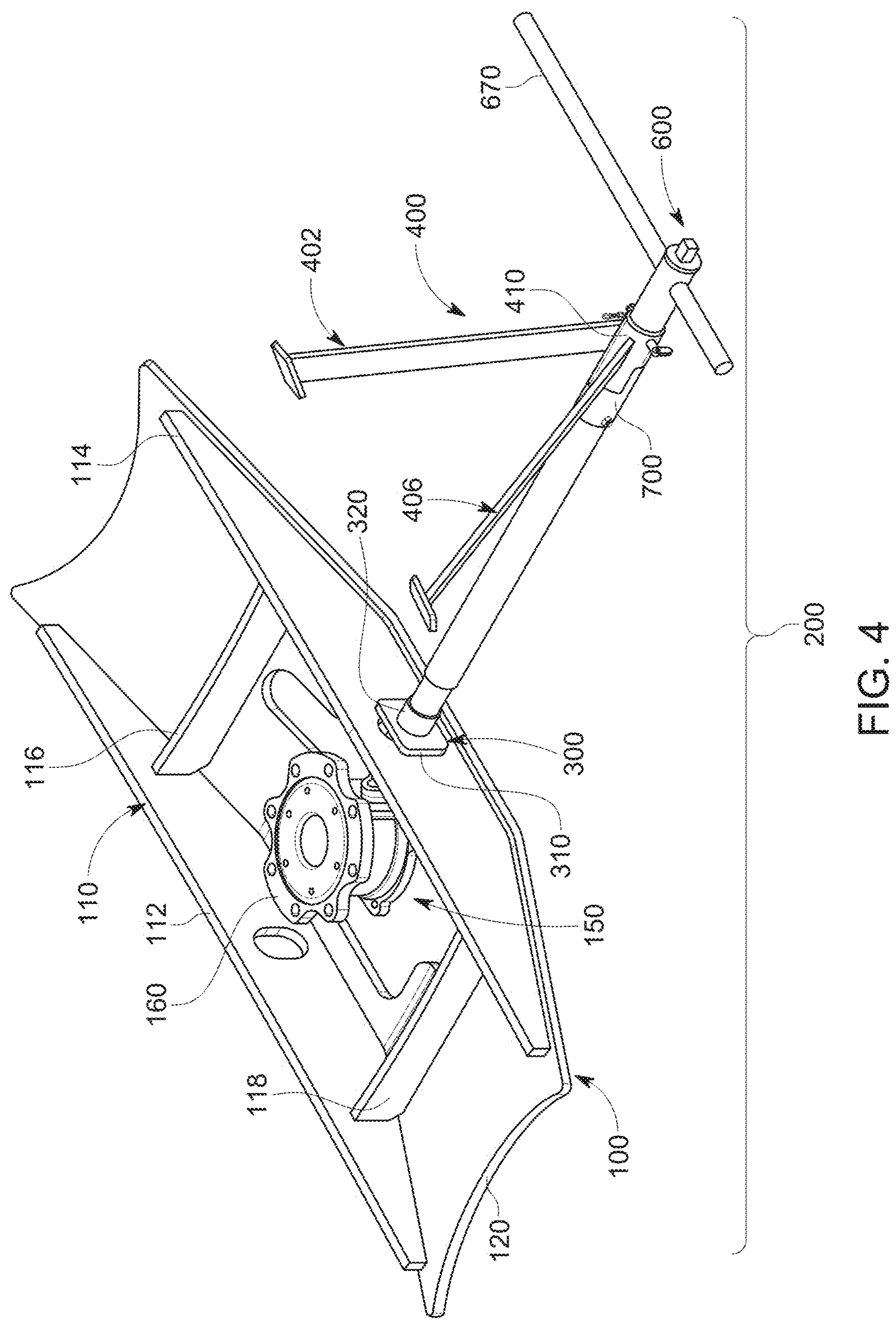
FIG. 4 is a first top perspective view of the valve protective enclosure, the discharge valve assembly, and the dis-engageable valve handle assembly of the railway tank car of FIG. 1, all shown removed from the railway tank car.
Figure 5:
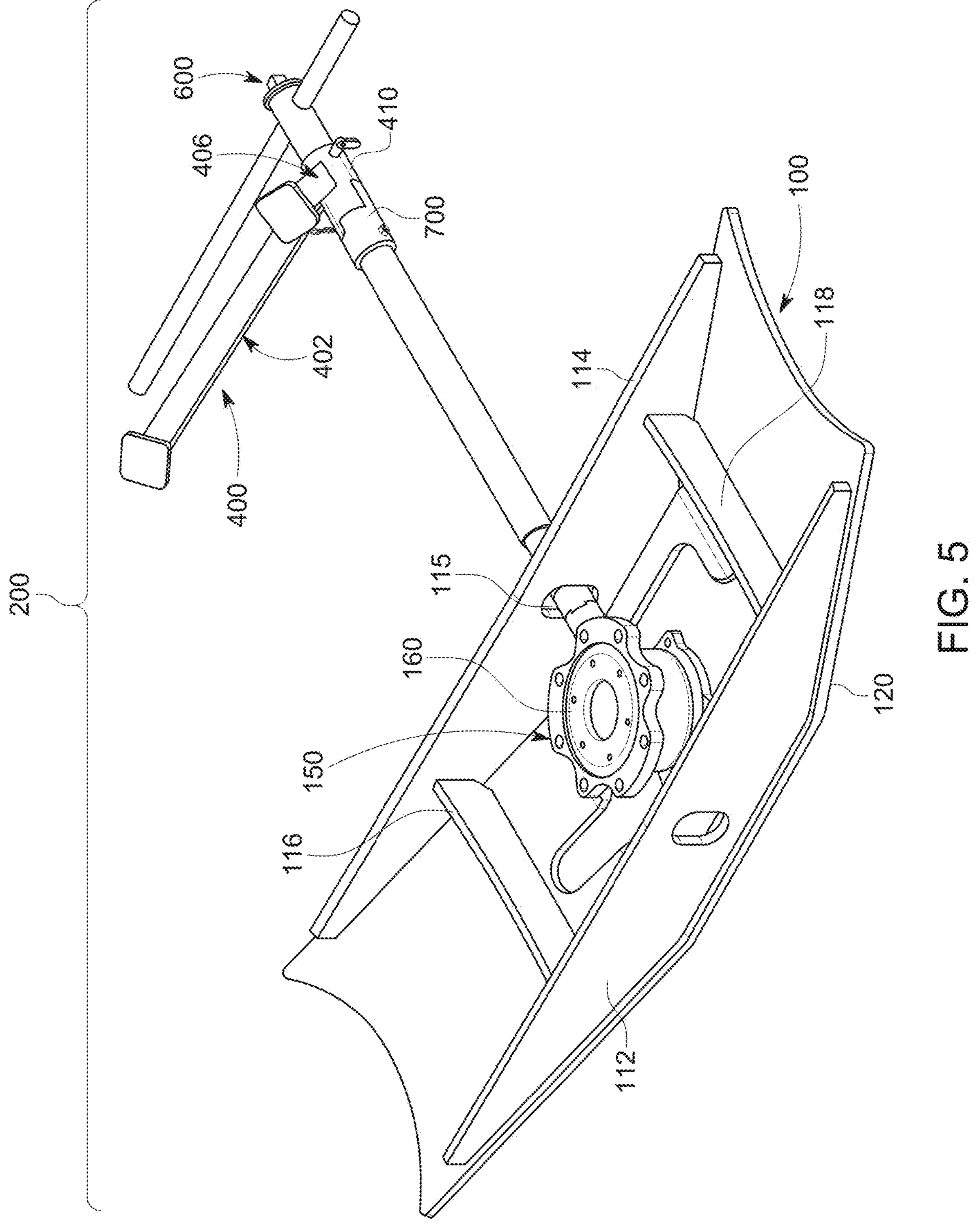
FIG. 5 is a second top perspective view of the valve protective enclosure, the discharge valve assembly, and the dis-engageable valve handle assembly of the railway tank car of FIG. 1, all shown removed from the railway tank car.

As best shown in FIGS. 9 and 14A-14D, the first inner fixed sleeve 320 includes a cylindrical tubular body 330, the inwardly extending first locking lip 340 mentioned above, and the inwardly extending second locking lip 350 mentioned above. The opposing locking lips 340 and 350 are spaced-apart and configured to engage the handle shaft receiver 250 of the valve stem adapter 220 as described above. The sleeve 320 is fixedly connected to the support plate 310 as best shown in FIG. 4. As mentioned above the locking lips and locking lip receiving pockets do not need to be opposing, can be asymmetrical, and the quantity of pockets and locking lips can vary in accordance with the present disclosure.

The first handle support assembly 300 is made from steel in this example embodiment, but can be made from other suitable materials in accordance with the present disclosure. The first handle support and locking assembly can be alternatively sized, shaped, and otherwise configured in accordance with the present disclosure.

The second handle support assembly 400 includes: (1) a second outer fixed sleeve 410; (2) a fixed first support arm 402; (3) a fixed second support arm 406; and (4) a partially moveable securement pin assembly 481. The second outer fixed sleeve 410 can be considered a guide sleeve.

As best shown in FIGS. 2, 3, 4, 5, 6, 10, 13, 15A-15D, and 16A-16D, the second outer fixed sleeve 410 includes a partially cylinder tubular body 415 that includes: (1) an outer wall 420; (2) a first edge 430 of the outer wall 420; (3) a second edge 440 of the outer wall 420; (4) a third edge 450 of the outer wall 420; (5) a fourth edge 460 of the outer wall 420; (6) a fifth edge 470 of the outer wall 420; and (7) a sixth edge 480 of the outer wall 420.

These edges of the outer wall 420 are configured to engage respective edges (described below) of the third moveable sleeve 700. It should be appreciated that the quantity of respective edges of the sleeve 410 and the sleeve 700 can vary in accordance with the present disclosure.

These edges of the outer wall 420 can define one or more shoulders that are configured to engage respective shoulders of the sleeve 700. It should be appreciated that the quantity of shoulders of the sleeve 410 and the sleeve 700 can vary in accordance with the present disclosure.

The outer wall 420 defines an inner central channel 475 defined by the inner surface of the outer wall 420 that is sized, shaped, and otherwise configured to receive the movable tube 610 of the handle assembly 600 such that the tube 610 is movable inwardly and outwardly in the fixed handle sleeve 410 and rotatable in the fixed handle sleeve 410.

The outer wall 420 also defines aligned spaced-apart securement pin receipt openings 472 and 474 sized, shaped, and otherwise configured to selectively receive the securement pin 484 such as shown in FIGS. 2, 3, 4, 5, and 16A.

The handle sleeve 410 also defines an opening 490 for receiving a lubricant such as grease.

The handle sleeve 410 is made from steel in this example embodiment, but can be made from other suitable materials in accordance with the present disclosure. The handle sleeve can be alternatively sized, shaped, and otherwise configured in accordance with the present disclosure.

As best shown in FIGS. 1, 2, 3, 4, 5, 6, 15A-15D, and 16A-16D, the fixed first support arm 402 includes a first bottom end fixedly connected to the second outer fixed sleeve 410 and a second end that includes a support hand (not labeled) fixedly connected to the tank 30. Likewise, the fixed second support arm 406 includes a first bottom end fixedly connected to the second outer fixed sleeve 410 and a second end that includes a support hand (not labeled) fixedly connected to the tank 30.

The first support arm 402 and the second support arm 406 are made from steel in this example embodiment, but can be made from other suitable materials in accordance with the present disclosure. The first support arm and the second support arm can be alternatively sized, shaped, and otherwise configured in accordance with the present disclosure.

As best shown in FIGS. 2, 3, 4, 5, 15A, 16A, and 17A, the securement pin assembly 481 includes a removable securement pin 484 and a movable tether such as chain 486. The securement pin 484 is connected to the first end of the chain 486, and the second end of the chain 486 is connected to the second outer fixed sleeve 410. The removable securement pin 484 is insertable into and through the sleeve 410 and into and through the moveable tube 610 to prevent movement of the tube 610.

The securement pin assembly 481 is made from steel in this example embodiment, but can be made from other suitable materials in accordance with the present disclosure. The securement pin assembly can be alternatively sized, shaped, and otherwise configured in accordance with the present disclosure.

The dis-engageable valve handle assembly 200 also includes the handle assembly 600 that includes: (1) an inwardly and outwardly movable and rotatably movable elongated tube 610; (2) an inwardly and outwardly movable and rotatably movable extension shaft 620 fixedly connected to and inner end of the tube 610; (3) an inwardly and outwardly movable and rotatably movable valve stem adapter engager 630 fixedly connected to the extension shaft 620; (4) an inwardly and outwardly movable and rotatably movable end member 640 fixedly connected to an outer end of the elongated tube 610; (5) an inwardly and outwardly movable and rotatably movable end drive 650 fixedly connected to the end member 640; (6) a handle 670 extending through the tube 610; and (7) the inwardly and outwardly movable and rotatably movable third sleeve 700 fixedly connected to the tube 610.

The elongated tube 610 is a hollow cylindrical member that defines: (1) a first transversely extending handle receipt opening (not labeled) sized, shaped, and otherwise configured to receive the handle 670; (2) a second transversely extending securement pin receipt opening (not labeled) sized, shaped, and otherwise configured to receive the securement pin 484; and (3) a sleeve fastener receipt opening (not labeled) sized, shaped, and otherwise configured to receive the sleeve fastener 764 that fixedly connects the sleeve 700 to the tube 610.

The elongated tube 610 is made from steel in this example embodiment, but can be made from other suitable materials in accordance with the present disclosure. The elongated tube can be alternatively sized, shaped, and otherwise configured in accordance with the present disclosure.

The extension shaft 620 is a solid cylindrical member that has a first outer end positioned in and fixedly connected to the elongated tube 610 and an inner end that is connected to valve stem adapter engager 630. In this example embodiment, the outer diameter of the extension shaft 620 is smaller than the inner diameter of the elongated tube 610 such that the first outer end can be positioned in the elongated tube 610 for attachment of these components. In other embodiments, these components can be attached in other suitable manners (such as but not limited to via a butt joint).

The extension shaft 620 is made from steel in this example embodiment, but can be made from other suitable materials in accordance with the present disclosure. The extension shaft can be alternatively sized, shaped, and otherwise configured in accordance with the present disclosure.

The valve stem adapter engager 630 is a solid member with four outer sides (not labeled), has an inner end that is fixedly connected to extension shaft 620, and is sized, shaped, and otherwise configured to be selectively positioned in the handle shaft receiving pocket 256 of the handle shaft receiver 250 of the valve stem adapter 220 as mentioned above. The outer walls (not individually labeled) are configured to engage the inner shaft engagement walls (not labeled) that define a handle shaft receiving pocket 256.

The valve stem adapter engager 630 is made from steel in this example embodiment, but can be made from other suitable materials in accordance with the present disclosure. The valve stem adapter engager can be alternatively sized, shaped, and otherwise configured in accordance with the present disclosure.

In this example embodiment, the extension shaft 620 and the valve stem adapter engager 630 are monolithically formed from one piece of steel, but can alternatively be formed from multiple pieces.

The end member 640 is a ring that is fixedly connected to the outer end of the elongated tube 610, has a greater outer diameter than the elongated tube 610, and has an outer diameter of equal to or greater than the second outer fixed sleeve 410. The end member 640 functions as a tube cap and also provides a surface for attachment (welding) of the end drive 650.

The end member 640 is made from steel in this example embodiment, but can be made from other suitable materials in accordance with the present disclosure. The end member can be alternatively sized, shaped, and otherwise configured in accordance with the present disclosure.

The end drive 650 is a tool engagement member that is fixedly connected to the end member 640 and is configured to be engaged by a suitable tool (not shown) to rotate the elongated tube 610 (if needed such as if the handle 670 breaks off).

The end drive 650 is made from steel in this example embodiment, but can be made from other suitable materials in accordance with the present disclosure. The end drive can be alternatively sized, shaped, and otherwise configured in accordance with the present disclosure.

The handle 670 extends through the transversely extending opening in the elongated tube 610 as best shown in FIGS. 2, 3, 4, 5, 15A-15D, 16A-16D, and 17A-17D and is configured to enable an operator to grip the handle 670 to move the elongated tube 610 inwardly and outwardly and to rotate the elongated tube 610 to operate the dis-engageable valve handle assembly 200 of the present disclosure.

The handle 670 is made from steel in this example embodiment, but can be made from other suitable materials in accordance with the present disclosure. The handle can be alternatively sized, shaped, and otherwise configured in accordance with the present disclosure.

The movable (including rotatable) sleeve 700 is fixedly connected to the extension tube 610 such that the sleeve 700 moves inwardly and outwardly and also rotates as the extension tube 610 moves inwardly and outwardly and rotates.

As best shown in FIGS. 2, 3, 4, 5, 6, 10, 12, 15A-15D, and 16A-16D, the moveable and rotatable sleeve 700 includes a partially cylinder tubular body 710 that includes: (1) an outer wall 720; (2) a first edge 730 of the outer wall 720; (3) a second edge 740 of the outer wall 720; (4) a third edge 750 of the outer wall 720; (5) a fourth edge 760 of the outer wall 720; (6) a fifth edge 770 of the outer wall 720; and (7) a sixth edge 780 of the outer wall 720.

These edges are configured to engage respective edges of the second outer fixed sleeve 410. It should be appreciated that the quantity of respective edges of the sleeve 700 and the sleeve 410 can vary in accordance with the present disclosure.

Theses edges of the outer wall 720 can define one or more shoulders that are configured to engage respective shoulders of the fixed outer sleeve 410. It should be appreciated that the quantity of shoulders of the moveable sleeve 700 and the fixed outer sleeve 410 can vary in accordance with the present disclosure.

The outer wall 720 defines an inner central channel 785 defined by the inner surface (not labeled) of the outer wall 720 that is sized, shaped, and otherwise configured to receive and be mounted on the elongated tube 610 of the handle assembly 600 such that the sleeve 700 is fixedly mounted to the tube 610 (and thus movable inwardly and outwardly with the tube 610 as well as rotatable with the tube 610).

The outer wall 720 also defines aligned spaced-apart fastener receipt openings 790 and 795 sized, shaped, and otherwise configured to selectively receive the fastener 764 that attaches the sleeve 700 to the tube 610 such as shown in FIG. 10.

The sleeve 700 is made from steel in this example embodiment, but can be made from other suitable materials in accordance with the present disclosure. The sleeve can be alternatively sized, shaped, and otherwise configured in accordance with the present disclosure.

The operation of the dis-engageable valve handle assembly 200 is now described with respect to FIGS. 14A to 18D.

FIGS. 14A, 15A, 16A, 17A, and 18A show the dis-engageable valve handle assembly 200 of the railway tank car 10 in a fully locked and valve-disengaged position. More specifically, in this fully locked and valve-disengaged position: (1) the securement pin 484 extends through both the sleeve 410 and the extension tube 610 to prevent rotation of the tube 610, to prevent inward movement of the tube 610, and to prevent outward movement of the tube 610; (2) the sleeve 700 is in engagement with the sleeve 410 to prevent rotation of the tube 610; (3) the engager 630 of the extension shaft 620 is withdrawn from and not received in the handle shaft receiving pocket 256 of the stem adapter 220; (4) the locking lips 340 and 350 of the sleeve 320 are in the locking lip receiving pockets 246A and 246*b* of the valve stem adapter 220 to prevent rotation of the valve stem receiver 230 and the entire valve stem adapter 220; (5) the valve 160 is closed; and (6) the handle 670 cannot be rotated because of the edge interaction between sleeves 400 and 700 and because of the securement pin 484. It should also be appreciated that the engager 630 is removed from but aligned with the handle shaft receiver 250 of the stem adapter 220, and that such alignment of the stem adapter 220 is axially maintained by engagement between the stem adapter 220 and the sleeve 320. It should also be appreciated that in this position, everything outside of the valve protective enclosure 100 can be removed, and the valve 160 would still be considered locked based on interaction of the stem adapter 220 and the sleeve 320. It should further be appreciated that the main purpose of the securement pin 484 is to keep the dis-engageable valve handle assembly 200 in the disengaged position, rather than to provide an explicit locking function for the valve 160. In alternative embodiments, the securement pin can be moved to sleeve 320. It should also be appreciated that in this locked and valve-disengaged position, an operator can remove the securement pin 484.

FIGS. 14B, 15B, 16B, 17B, and 18B show the dis-engageable valve handle assembly 200 of the railway tank car 10 in a locked position and valve-engaged position. More specifically, in this locked and valve-engaged position, the extension tube 610 has been moved by the operator inwardly to a first position by the operator by pushing the handle 670 and thus the tube 610 inwardly. Due to this inward movement of the extension tube 610: (1) the movable sleeve 700 has moved inwardly, but the moveable sleeve 700 still partially engages the fixed sleeve 410 and thus the moveable sleeve 700 and the extension tube 610 are not yet rotatable; (2) the engager 630 of the extension shaft 620 is received in the handle shaft receiving pocket 256 of the stem adapter 220; (3) the locking lips 340 and 350 of the sleeve 320 are still in the locking lip receiving pockets 246A and 246*b* of the valve stem adapter 220 to also still prevent rotation of the valve stem receiver 230 and the entire valve stem adapter 220; (4) the stem adapter 220 is thus engaged but still locked; and (5) the valve 160 is still closed. The position shown in FIGS. 14B, 15B, 16B, 17B, and 18B thus indicates that engagement of the stem adapter 220 and the unlocking of the stem adapter 220 are separate. In other words, engagement with the stem adapter 220 has occurred at this point, but the spring 280 has not yet been compressed to unlock the stem adapter 220.

FIGS. 14C, 15C, 16C, 17C, and 18C show the dis-engageable valve handle assembly 200 of the railway tank car 10 in an un-locked position and a valve-engaged position. More specifically, in this un-locked and valve-engaged position the extension tube 610 has been further moved inwardly to a second position by the operator by further pushing the handle 670 and thus the tube 610 inwardly. Due to this further inward movement of the extension tube 610, the sleeve 700 is rotatable relative to the sleeve 410, and specifically: (a) the respective edges 740 and 460 are horizontally aligned, but no longer prevent rotation of the tube 610 and the handle 670; and (b) respective edges 730 and 450 are vertically aligned, but do not prevent axial movement of the handle 670. It should be appreciated that the respective outer end edges of the sleeves 410 and 700 can be slightly spaced-apart or can be in engagement in a manner that enables rotation of sleeve 700 relative to sleeve 410. Additionally, due to this further inward movement of the extension tube 610: (1) the extension tube 610 engages and has inwardly moved and caused the valve stem adapter 220 to move inwardly against the bias of the spring 280; (2) the locking lips 340 and 350 of the sleeve 320 have disengaged from being in the locking lip receiving pockets 246A and 246*b* of the valve stem adapter 220 and thus no longer prevent rotation of the valve stem receiver 230 and the entire valve stem adapter 220; and (3) the valve 160 is still closed. It should be appreciated that the outer end edges of the valve stem adapter 220 and the sleeve 320 can be slightly spaced-apart or can be in engagement in a manner that allows for rotation of valve stem adapter 220 relative to sleeve 320.

FIGS. 14D, 15D, 16D, 17D, and 18D show the dis-engageable valve handle assembly 200 of the railway tank car 10 in an un-locked position, a valve-engaged, and valve stem rotated position. In this position, the extension tube 610 has been rotated by the operator clockwise using the handle 670 to open the valve 160. More specifically, due to this rotation of the handle 670 and the corresponding rotation of the extension tube 610: (1) the sleeve 700 has been rotated clockwise; (2) the engager 630 of the extension shaft 620 has been rotated clockwise and has rotated of the entire valve stem adapter 220 clockwise; and (3) the valve stem adapter 220 has rotated the valve stem 164 clockwise. The rotation of the valve stem 164 cause an internal ball (not shown) or other flow control mechanism (not shown) of the valve 160 to open the valve 160. In this position, the respective combinations of: (1) the stem adapter 220 and the sleeve 320; and (2) the sleeves 700 and 410 are configured to prevent disengagement (via axial movement) when the valve stem adapter 220 is rotated to any degree and thus when the valve 160 is open to any degree (i.e., the edges 730 and 450 of the sleeves 700 and 410 prevent axial movement of the handle 670). In other words, outer end edges of the valve stem adapter 220 and the outer end edges of the sleeves are in engagement and are configured to prevent disengagement of the handle until the valve 160 is fully closed. It should thus be appreciated that these components are configured to prevent rotation when locked and engaged, and to prevent disengagement when the valve 160 is any degree open. As explained below, due to tolerances, certain movements can occur and the further embodiment described below account for such tolerances and further limit such possible movements.

It should be appreciated the operation for closing the valve is reversed from the above operation, except that after rotating the handle in the counter-clockwise direction, the spring 280 assist in moving the tube 610 outwardly. While the spring 280 assists in moving the stem adapter 220 outwardly, the operator may not notice much of an assist on the handle 670.

It should be appreciated from the above that present disclosure provides a dis-engagable handle assembly: (1) controlled by the interaction of the sleeves 410 and 700 that are positioned outside the valve protective enclosure 100 during transit; (2) controlled by the interaction of the sleeves 410 and 700 that prevent the valve 160 from opening unintentionally; (3) that provides locking and disengaging inside of the valve protective enclosure 100; and (4) that meets the requirements of the regulations mentioned above.

It should further be appreciated from the above that the present disclosure simplifies the operation of the handle assembly. In the previous handle assembly configurations, the operator had to engage a T-pin with one hand and turn the handle with the other hand in a manner that was difficult to perform. Such handle assemblies were also prone to jamming due to various environmental conditions (that further complicated the operating process). It should be appreciated from the above that present disclosure replaces the T-pin assembly with the interfacing interlocking sleeves as a way to control when the valve can be operated. This enables the operator to have both hands available to engage and turn the handle.

The present disclosure also contemplates numerous various alternative embodiments such as but not limited to the following alternative embodiments.

In various alternative embodiments, the configurations of the sleeves can be reversed to enable clockwise and counter-clockwise rotation of the handle.

In various alternative embodiments, the lengths of the handle can be shortened such as for railway tank cars with ladders centered on the railway tank car.

In various alternative embodiments, the guide sleeve 410 can be alternatively or additionally attached to the valve protective enclosure 100, the tank 30, or a part of a jacket of the tank 30.

In various alternative embodiments, the size, shape, and configurations of the sleeve, pockets, and locking lips can vary.

As mentioned above, FIGS. 19, 20, 21, and 22 show alternative embodiments of the stem adapter and the locking sleeve mentioned above.

In this alternative embodiment, the valve stem adapter 1220 includes two fixedly connected sections and specifically: (1) a valve stem receiver 1230; and (2) a handle shaft receiver 1250 fixedly connected to the valve stem receiver 1230. The valve stem adapter 1220 is made from steel in this example embodiment, but can be made from other suitable materials in accordance with the present disclosure. The valve stem adapter 1220 can be alternatively sized, shaped, and otherwise configured in accordance with the present disclosure.

The valve stem receiver 1230 includes a cylindrical solid body that includes a plurality of inner shaft engagement walls (not labeled) that define a valve stem receiving pocket 1236. The valve stem receiving pocket 1236 is configured to receive the valve stem 164 such that rotation of the valve stem adapter 1220 causes rotation of the valve stem 164 in the same rotational direction as rotation of the valve stem adapter 1220. In other words, the inner shaft engagement walls (not labeled) are configured to engage the outer walls (not labeled) of the valve stem 164.

The body of the valve stem receiver 1230 of the valve stem adapter 1220 includes a plurality of transversely extending inner securement pin engagement walls (not labeled) that define a transversely extending securement pin receiving channel that has two aligned spaced-apart sections **1242*a* and 1242*b* that are respectively sized, shaped, and otherwise configured to receive a securement pin such as locking roll pin (not shown). The locking roll pin can extend through the sections 1242*a* and 1242*b* of the transversely extending securement pin receiving channel of the valve stem receiver 1230 and through the valve stem 164 to secure the valve stem receiver 1230 to the valve stem 164. The sections 1242*a* and 1242*b* of the transversely extending securement pin receiving channel of the valve stem receiver 1230 are slotted or oval to enable the relative inward and outward movements of the valve stem receiver 1230 to the valve stem 164**.

The body of the valve stem receiver 1230 of the valve stem adapter 1220 includes a plurality of outer walls that define four unevenly spaced locking lip receiving pockets (including illustrated pockets **1246*a* and 1246*b*) of the valve stem receiver 1230. The locking lip receiving pockets are configured to selectively receive unevenly spaced-apart locking lips 1340, 1345, 1350, and 1355 of the first inner fixed sleeve 1320 such as partially shown in FIG. 22**. It should also be appreciated that the locking lips can be of two or more different sizes (such as different widths).

When the valve stem receiver 1230 of the valve stem adapter 1220 is moved inwardly toward the valve 160, the locking lips of the fixed sleeve 1320 disengage from being in the locking lip receiving pockets of the valve stem receiver 1230 and enable (i.e., do not prevent) rotation of the valve stem receiver 1230 and thus of the valve stem adapter 1220.

The handle shaft receiver 1250 of valve stem adapter 1220 is fixedly connected (as one piece in this example embodiment) to the valve stem receiver 1230. The handle shaft receiver 1250 includes a plurality of inner shaft engagement walls (not labeled) that define a handle shaft receiving pocket 1256. The handle shaft receiving pocket 1256 is configured to receive the engager 630 of the valve stem adapter engager 620 of the handle assembly 600 (such as described above). When the engager 630 of the extension shaft 620 moves inwardly: (1) the engager 630 is received in the handle shaft receiving pocket 1256 and causes the handle shaft receiver 1250 to move inwardly (against the bias of the spring 280 of the discharge valve assembly 150), (2) which causes the valve stem receiver 1230 to move inwardly toward the valve 160, (3) thus causing the locking lips of the fixed sleeve 1320 to be disengaged from being in the locking lip receiving pockets of the valve stem adapter 1220, and (4) which enables rotation of the valve stem receiver 1230 and thus the entire valve stem adapter 1220.

The first inner fixed sleeve 1320 includes a cylindrical tubular body 1330, the inwardly extending first locking lips 1340, 1345, 1350, and 1355 mentioned above. The locking lips 1340, 1345, 1350, and 1355 are asymmetrically positioned to provide enhanced prevention from locking in a valve open position. The locking lips 1340, 1345, 1350, and 1355 are asymmetrically sized to provide enhanced prevention from locking in a valve open position. The locking lips 1340, 1345, 1350, and 1355 are asymmetrically positioned and sized to provide enhanced prevention from locking in a valve open position. In other words, the asymmetry of the locking lip prevents the stem adapter 1220 from locking in an open position. It should be appreciated that there in certain situations there can be some assembly tolerances that allow a gap between edges 450 and 730 of the sleeves 410 and 700 described above that would in turn allow enough axial movement for the stem adapter 1220 to engage if the locking lips are of equal size and spacing, and thus the asymmetry reduces or eliminates this issue.

It will be understood that modifications and variations may be effected without departing from the scope of the novel concepts of the present invention, and it is understood that this application is to be limited only by the scope of the claims.

The invention claimed is:

1. A railway tank car comprising:

a frame;

a tank supported by the frame;

a discharge valve assembly connected to the tank and including a valve and a valve stem connected to the valve, the valve stem rotatable in a first direction to cause the valve to open and rotatable in an opposite second direction to cause the valve to close;

an inner fixed locking sleeve;

a valve stem adapter:

(i) lockable with the inner fixed locking sleeve to prevent rotation of the valve stem adapter, and (ii) unlockable from the inner fixed locking sleeve to enable the valve stem adapter to be rotated in:

(a) the first direction to rotate the valve stem to open the valve, and (b) the second direction to rotate the valve stem in the second direction to close the valve;

an outer fixed sleeve fixedly connected to the tank;

an extension tube movable in the outer fixed sleeve;

a handle connected to the extension tube; and a movable sleeve fixedly connected to the extension tube, the movable sleeve:

(i) movable to a first position relative to and engaging the outer fixed sleeve to prevent rotation of the movable sleeve and the extension tube, and (ii) movable to a second position at which the movable sleeve and the extension tube are rotatable relative to the outer fixed sleeve.

2. The railway tank car of claim 1, which includes a valve protective enclosure connected to the tank, the valve protective enclosure positioned to protect the discharge valve assembly.

3. The railway tank car of claim 2, wherein the inner fixed locking sleeve is fixedly connected to and supported by the valve protective enclosure.

4. The railway tank car of claim 1, wherein the valve stem adapter defines a locking lip receiving pocket, and the inner fixed locking sleeve includes an inwardly extending locking lip receivable in the locking lip receiving pocket of the valve stem adapter to prevent rotation of the valve stem adapter.

5. The railway tank car of claim 1, wherein the valve stem adapter defines a plurality of spaced-apart locking lip receiving pockets, and the inner fixed locking sleeve includes a plurality of spaced-apart inwardly extending locking lips receivable in the locking lip receiving pockets of the valve stem adapter to prevent rotation of the valve stem adapter.

6. The railway tank car of claim 1, wherein the valve stem adapter defines a plurality of asymmetrically spaced-apart locking lip receiving pockets, and the inner fixed locking sleeve includes a plurality of asymmetrically spaced-apart inwardly extending locking lips receivable in the locking lip receiving pockets of the valve stem adapter to prevent rotation of the valve stem adapter.

7. The railway tank car of claim 1, wherein the valve stem adapter defines a plurality of asymmetrically sized locking lip receiving pockets, and the inner fixed locking sleeve includes a plurality of asymmetrically sized inwardly extending locking lips receivable in the locking lip receiving pockets of the valve stem adapter to prevent rotation of the valve stem adapter.

8. The railway tank car of claim 1, wherein the valve stem adapter defines a plurality of asymmetrically spaced-apart and sized locking lip receiving pockets, and the inner fixed locking sleeve includes a plurality of asymmetrically spaced- apart and sized inwardly extending locking lips receivable in the locking lip receiving pockets of the valve stem adapter to prevent rotation of the valve stem adapter.

9. The railway tank car of claim 1, which includes a spring that biases the valve stem adapter to a position in which the valve stem adapter is locked with the inner fixed locking sleeve.

10. The railway tank car of claim 1, wherein the valve stem adapter includes a valve stem receiver and a handle shaft receiver fixedly connected to the valve stem receiver.

11. The railway tank car of claim 10, wherein the valve stem receiver defines a valve stem receiving pocket configured to receive the valve stem.

12. The railway tank car of claim 10, which includes an engager connected to the extension tube.

13. The railway tank car of claim 10, wherein the handle shaft receiver defines a handle shaft receiving pocket configured to receive the engager connected to the extension tube.

14. The railway tank car of claim 13, wherein when the movable sleeve:

(i) is in the first position, the engager connected to the extension tube is not in the handle shaft receiving pocket; and (ii) is in the second position, the engager connected to the extension tube is in the handle shaft receiving pocket.

15. The railway tank car of claim 10, wherein when the engager is removed from the handle shaft receiver of the valve stem adapter, alignment of the valve stem adapter is axially maintained by engagement between the valve stem adapter and the inner fixed locking sleeve.

16. The railway tank car of claim 1, wherein the outer fixed sleeve includes a first shoulder, and the movable sleeve includes a first shoulder engageable with the first shoulder of the outer fixed sleeve.

17. The railway tank car of claim 1, wherein the outer fixed sleeve includes a first shoulder and a second shoulder, and the movable sleeve includes a first shoulder and a second shoulder, wherein the first shoulders are engageable and the second shoulders are engageable.

18. A railway tank car comprising:
a frame;
a tank supported by the frame;
a discharge valve assembly connected to the tank and including a valve and a valve stem connected to the valve, the valve stem rotatable in a first direction to cause the valve to open and rotatable in an opposite second direction to cause the valve to close;
an inner fixed locking sleeve including a plurality of spaced-apart inwardly extending locking lips;
a valve stem adapter:
(i) that defines a plurality of spaced-apart locking lip receiving pockets configured to receive the plurality of spaced-apart inwardly extending locking lips to prevent rotation of the valve stem adapter, and
(ii) that is unlockable from the inner fixed locking sleeve to enable the valve stem adapter to be rotated in:
(a) the first direction to rotate the valve stem to open the valve, and
(b) the second direction to rotate the valve stem in the second direction to close the valve;
an outer fixed sleeve;
an extension tube movable in the outer fixed sleeve;
a handle connected to the extension tube; and
a movable sleeve fixedly connected to the extension tube, the movable sleeve:
(i) movable to a first position relative to and engaging the outer fixed sleeve to prevent rotation of the movable sleeve and the extension tube, and
(ii) movable to a second position at which the movable sleeve and the extension tube are rotatable relative to the outer fixed sleeve.

19. A railway tank car comprising:
a frame;
a tank supported by the frame;
a discharge valve assembly connected to the tank and including a valve and a valve stem connected to the valve, the valve stem rotatable in a first direction to cause the valve to open and rotatable in an opposite second direction to cause the valve to close;
an inner fixed locking sleeve;
a valve stem adapter including a valve stem receiver and a handle shaft receiver fixedly connected to the valve stem receiver, the valve stem adapter:
(i) lockable with the inner fixed locking sleeve to prevent rotation of the valve stem adapter, and
(ii) unlockable from the inner fixed locking sleeve to enable the valve stem adapter to be rotated in:
(a) the first direction to rotate the valve stem to open the valve, and
(b) the second direction to rotate the valve stem in the second direction to close the valve;
an outer fixed sleeve;
an extension tube movable in the outer fixed sleeve;
a handle connected to the extension tube; and
a movable sleeve fixedly connected to the extension tube, the movable sleeve:
(i) movable to a first position relative to and engaging the outer fixed sleeve to prevent rotation of the movable sleeve and the extension tube, and
(ii) movable to a second position at which the movable sleeve and the extension tube are rotatable relative to the outer fixed sleeve.

20. The railway tank car of claim 19, wherein the valve stem receiver defines a valve stem receiving pocket configured to receive the valve stem.

21. The railway tank car of claim 19, which includes an engager connected to the extension tube.

22. The railway tank car of claim 19, wherein the handle shaft receiver defines a handle shaft receiving pocket configured to receive the engager connected to the extension tube.

23. The railway tank car of claim 22, wherein when the movable sleeve:
(i) is in the first position, the engager connected to the extension tube is not in the handle shaft receiving pocket; and
(ii) is in the second position, the engager connected to the extension tube is in the handle shaft receiving pocket.

24. The railway tank car of claim 19, wherein when the engager is removed from the handle shaft receiver of the valve stem adapter, alignment of the valve stem adapter is axially maintained by engagement between the valve stem adapter and the inner fixed locking sleeve.

25. A railway tank car comprising:
a frame;
a tank supported by the frame;
a discharge valve assembly connected to the tank and including a valve and a valve stem connected to the valve, the valve stem rotatable in a first direction to cause the valve to open and rotatable in an opposite second direction to cause the valve to close;
an inner fixed locking sleeve;
a valve stem adapter:
(i) lockable with the inner fixed locking sleeve to prevent rotation of the valve stem adapter, and
(ii) unlockable from the inner fixed locking sleeve to enable the valve stem adapter to be rotated in:
(a) the first direction to rotate the valve stem to open the valve, and
(b) the second direction to rotate the valve stem in the second direction to close the valve;
an outer fixed sleeve including a first shoulder;
an extension tube movable in the outer fixed sleeve;
a handle connected to the extension tube; and
a movable sleeve fixedly connected to the extension tube, the movable sleeve including a first shoulder engageable with the first shoulder of the outer fixed sleeve, the movable sleeve:
(i) movable to a first position relative to and engaging the outer fixed sleeve to prevent rotation of the movable sleeve and the extension tube, and
(ii) movable to a second position at which the movable sleeve and the extension tube are rotatable relative to the outer fixed sleeve.

* * * * *